US012289796B2

(12) United States Patent
Shahidi et al.

(10) Patent No.: US 12,289,796 B2
(45) Date of Patent: Apr. 29, 2025

(54) TECHNIQUES FOR DUAL ACTIVE SUBSCRIBER TRANSMIT SHARING

(71) Applicant: QUALCOMM Incorporated, San Diego, CA (US)

(72) Inventors: Reza Shahidi, San Diego, CA (US); Qingxin Chen, San Diego, CA (US); Lan Lan, San Diego, CA (US); Cheol Hee Park, San Diego, CA (US); James Beckman, La Jolla, CA (US); Leena Zacharias, San Jose, CA (US); Arnaud Meylan, San Diego, CA (US); Krishna Chaitanya Mukkera, San Diego, CA (US); Ambarish Tripathi, San Diego, CA (US); Zhibin Dang, San Diego, CA (US); Ashwin Madhur Comandur, San Diego, CA (US); Sivaram Srivenkata Palakodety, San Diego, CA (US); Sridhar Bandaru, Westminster, CO (US)

(73) Assignee: QUALCOMM Incorporated, San Diego, CA (US)

(*) Notice: Subject to any disclaimer, the term of this patent is extended or adjusted under 35 U.S.C. 154(b) by 450 days.

(21) Appl. No.: 17/654,348

(22) Filed: Mar. 10, 2022

(65) Prior Publication Data
US 2022/0295262 A1 Sep. 15, 2022

Related U.S. Application Data

(60) Provisional application No. 63/159,841, filed on Mar. 11, 2021.

(51) Int. Cl.
H04W 8/18 (2009.01)
H04W 60/00 (2009.01)
(Continued)

(52) U.S. Cl.
CPC ......... *H04W 8/183* (2013.01); *H04W 60/005* (2013.01); *H04W 60/04* (2013.01);
(Continued)

(58) Field of Classification Search
CPC ... H04W 8/183; H04W 60/005; H04W 60/04; H04W 72/21; H04W 72/569; H04W 88/06
See application file for complete search history.

(56) References Cited

U.S. PATENT DOCUMENTS 9,780,822 B2 10/2017 Krishnamoorthi et al.
11,044,783 B2 6/2021 Majumder et al.
(Continued)

FOREIGN PATENT DOCUMENTS

CN 108242991 A 7/2018

OTHER PUBLICATIONS

International Search Report and Written Opinion—PCT/US2022/071099—ISA/EPO—Jun. 7, 2022.

Primary Examiner — Yuwen Pan
Assistant Examiner — Abdullah Al Mamun
(74) Attorney, Agent, or Firm — Dalei Dong; Harrity & Harrity, LLP

(57) ABSTRACT

Various aspects of the present disclosure generally relate to wireless communication. In some aspects, a user equipment (UE) may initiate a first service, having a first priority during a time interval, associated with a first subscriber identification module (SIM), and a second service, having a second priority during the time interval, associated with a second SIM of the UE, the first priority having a higher priority than the second priority. The UE may identify a first type of communication associated with the second SIM. The UE may adjust, based at least in part on the first type of communication, at least one of the first priority or the second (Continued)

priority during the time interval. The UE may perform a communication in accordance with the adjusted at least one of the first priority or the second priority. Numerous other aspects are described.

30 Claims, 8 Drawing Sheets

(51) Int. Cl.
*H04W 60/04* (2009.01)
*H04W 72/21* (2023.01)
*H04W 72/566* (2023.01)
*H04W 88/06* (2009.01)

(52) U.S. Cl.
CPC ......... *H04W 72/21* (2023.01); *H04W 72/569* (2023.01); *H04W 88/06* (2013.01)

(56) References Cited

U.S. PATENT DOCUMENTS

| | | |
|---|---|---|
| 11,172,033 B2 | 11/2021 | Dandra et al. |
| 2015/0023258 A1* | 1/2015 | Hu ........................ H04W 76/15 370/328 |
| 2016/0338077 A1 | 11/2016 | Chin et al. |
| 2021/0014822 A1 | 1/2021 | Gurumoorthy et al. |
| 2021/0029773 A1* | 1/2021 | Majumder ............ H04W 8/183 |

* cited by examiner

TECHNIQUES FOR DUAL ACTIVE SUBSCRIBER TRANSMIT SHARING

CROSS-REFERENCE TO RELATED APPLICATION

This patent application claims priority to U.S. Provisional Patent Application No. 63/159,841, filed on Mar. 11, 2021, entitled "TECHNIQUES FOR DUAL ACTIVE SUBSCRIBER TRANSMIT SHARING," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for dual active subscriber transmit sharing.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes initiating a first service, having a first priority during a time interval, associated with a first subscriber identification module (SIM) of the UE; initiating a second service, having a second priority during the time interval, associated with a second SIM of the UE, wherein the first service and the second service are active contemporaneously, the first priority having a higher priority than the second priority; identifying a first type of communication associated with the second SIM; adjusting, based at least in part on the first type of communication, at least one of the first priority or the second priority during the time interval; and performing a communication in accordance with the adjusted at least one of the first priority or the second priority.

In some aspects, the first service and the second service are non-voice services.

In some aspects, the first service and the second service are associated with scheduling request based scheduling configurations.

In some aspects, the adjusting of the at least one of the first priority or the second priority comprises modifying a window associated with the first priority to include at least one scheduling request occasion associated with the second SIM, where the first type of communication is a scheduling request.

In some aspects, for a priority configuration with a fixed ratio of a duration of a window associated with the first priority to a duration of a window associated with the second priority, a time interval of the priority configuration is determined such that the duration of the window associated with the first priority is equal to or larger than a maximum scheduling request occasion periodicity.

In some aspects, if a maximum scheduling request occasion periodicity of the UE is less than or equal to a duration of a window associated with the second priority, the window associated with the first priority is configured to have a length greater than the maximum scheduling request occasion periodicity, and a length of the time interval is configured as a default value.

In some aspects, the first service is associated with a first scheduling request occasion periodicity and the second service is associated with a second scheduling request occasion periodicity, and wherein, if the second scheduling request occasion periodicity is greater than or equal to a ratio of a duration of the window associated with the second priority and a length of the time interval, multiplied by the first scheduling request occasion periodicity, the length of the time interval is determined based at least in part on combining the length of the time interval and the second scheduling request occasion periodicity and dividing the combination by the duration of the window associated with the second periodicity.

In some aspects, the first service is associated with a first scheduling request occasion periodicity and the second service is associated with a second scheduling request occasion periodicity, and wherein, if a ratio of a duration of the length of the window associated with the second priority and the duration of the time interval, multiplied by the first scheduling request occasion periodicity, is less than the second scheduling request occasion periodicity, the duration of the time interval is determined based at least in part on combining the duration of the time interval and the first scheduling request occasion periodicity and dividing the combination by the length of the window associated with the first priority.

In some aspects, the first type of communication is a control or signaling transmission.

In some aspects, a periodicity of the control or signaling transmission is determined as a maximum of a configured periodicity and a lower bound.

In some aspects, the control or signaling transmission carries at least one of: a channel state information report, a sounding reference signal, or a hybrid automatic repeat request acknowledgment message.

In some aspects, adjusting the at least one of the first priority or the second priority during the time interval is based at least in part on a transmission cancellation counter specific to the first type of communication.

In some aspects, adjusting the at least one of the first priority or the second priority during the time interval is based at least in part on a plurality of transmission cancellation counters corresponding to respective types of transmissions.

In some aspects, the adjusting the at least one of the first priority or the second priority during the time interval further comprises prioritizing the control or signaling transmission based at least in part on a transmission cancellation counter of the control or signaling transmission satisfying a threshold.

In some aspects, the prioritization of the control or signaling transmission is performed by a physical layer of the UE.

In some aspects, the threshold for the transmission cancellation counter is determined based at least in part on a random or pseudo-random procedure.

In some aspects, the threshold for the transmission cancellation counter is predefined or configurable.

In some aspects, the transmission cancellation counter is one of a plurality of transmission cancellation counters, where one or more of the plurality of transmission cancellation counters are associated with the first service and one or more of the plurality of transmission cancellation counters are associated with the second service.

In some aspects, the transmission cancellation counter indicates a number of consecutive cancelled control or signaling transmissions, of a type of transmission and associated with a given SIM of the first SIM or the second SIM, and the transmission cancellation counter is reset to an initial value when a transmission of the type of transmission is successfully transmitted for the given SIM.

In some aspects, adjusting the at least one of the first priority or the second priority during the time interval comprises adjusting at least one of a first window associated with quality of service (QoS) based traffic at the first priority or a second window associated with best-effort traffic at the second priority.

In some aspects, performing the communication further comprises obtaining, during the first window, one or more packets associated with a QoS level from a buffer, wherein the one or more packets are QoS based traffic; and transmitting the one or more packets.

In some aspects, the one or more packets are obtained irrespective of whether the one or more packets are associated with the first service or the second service.

In some aspects, the one or more packets are associated with at least one of: a voice call, a video telephony call, or a signaling radio bearer.

In some aspects, performing the communication further comprises: obtaining, during a time window associated with the second priority, one or more non-QoS packets, wherein the one or more non-QoS packets are best-effort traffic; and transmitting the one or more non-QoS packets.

In some aspects, the one or more non-QoS packets are obtained irrespective of whether the one or more non-QoS packets are associated with the first service or the second service.

In some aspects, the first type of communication is a scheduling request.

In some aspects, the method includes determining a threshold for a transmit recovery procedure associated with failed scheduling request attempts, wherein the threshold is defined based at least in part on a grant cancellation ratio, and wherein adjusting the at least one of the first priority or the second priority during the time interval is based at least in part on the threshold.

In some aspects, the grant cancellation ratio is maintained within a time window.

In some aspects, performing the communication further comprises performing the transmit recovery procedure based at least in part on the grant cancellation ratio satisfying the threshold.

In some aspects, the transmit recovery procedure comprises a physical random access channel (PRACH) procedure that is initiated in accordance with the grant cancellation ratio satisfying the threshold.

In some aspects, the PRACH procedure is associated with an increased transmit power level relative to a baseline PRACH procedure.

In some aspects, the method includes maintaining a current value of an SR attempt counter based at least in part on the one or more SRs being dropped due to the transmit resource sharing scheme.

In some aspects, the transmit recovery procedure is associated with recovering from an out-of-synchronization state.

In some aspects, the transmit recovery procedure is based at least in part on a modulation and coding scheme (MCS) threshold for an uplink communication of the UE.

In some aspects, the threshold associated with the one or more SRs indicates a number of failed SR transmissions, and the threshold is adjustable based at least in part on the grant cancellation ratio.

In some aspects, a UE for wireless communication includes a memory and one or more processors, coupled to the memory, configured to: initiate a first service, having a first priority during a time interval, associated with a first SIM of the UE; initiate a second service, having a second priority during the time interval, associated with a second SIM of the UE, wherein the first service and the second service are active contemporaneously, the first priority having a higher priority than the second priority; identify a first type of communication associated with the second SIM; adjust, based at least in part on the first type of communication, at least one of the first priority or the second priority during the time interval; and perform a communication in accordance with the adjusted at least one of the first priority or the second priority.

In some aspects, a non-transitory computer-readable medium storing a set of instructions for wireless communication includes one or more instructions that, when executed by one or more processors of a UE, cause the UE to: initiate a first service, having a first priority during a time interval, associated with a first SIM of the UE; initiate a second service, having a second priority during the time interval, associated with a second SIM of the UE, wherein the first service and the second service are active contemporaneously, the first priority having a higher priority than the second priority; identify a first type of communication associated with the second SIM; adjust, based at least in part on the first type of communication, at least one of the first priority or the second priority during the time interval; and perform a communication in accordance with the adjusted at least one of the first priority or the second priority.

In some aspects, an apparatus for wireless communication includes means for initiating a first service, having a first priority during a time interval, associated with a first SIM of the apparatus; means for initiating a second service, having a second priority during the time interval, associated with a second SIM of the apparatus, wherein the first service and the second service are active contemporaneously, the first priority having a higher priority than the second priority; means for identifying a first type of communication associated with the second SIM; means for adjusting, based at least in part on the first type of communication, at least one of the first priority or the second priority during the time interval; and means for performing a communication in accordance with the adjusted at least one of the first priority or the second priority.

Some aspects described herein relate to a UE for wireless communication (such as an apparatus of the UE). The user equipment may include a memory and one or more processors coupled to the memory. The one or more processors may be configured to initiate a first service, having a first priority during a time interval, associated with a first SIM of the UE. The one or more processors may be configured to initiate a second service, having a second priority during the time interval, associated with a second SIM of the UE, wherein the first service and the second service are active at the same time, the first priority having a higher priority than the second priority. The one or more processors may be configured to identify a first type of communication to be performed by the UE during the time interval, the first type of communication being associated with the second service. The one or more processors may be configured to adjust, based at least in part on identifying that the first type of communication is to be performed, at least one of the first priority or the second priority during the time interval. The one or more processors may be configured to perform during the time interval and at different times, communications associated with the first and the second service, including the first type of communication, in accordance with the adjusted at least one of the first priority or the second priority.

Some aspects described herein relate to a method of wireless communication performed by a UE. The method may include initiating a first service, having a first priority during a time interval, associated with a first SIM of the UE. The method may include initiating a second service, having a second priority during the time interval, associated with a second SIM of the UE, wherein the first service and the second service are active at the same time, the first priority having a higher priority than the second priority. The method may include identifying a first type of communication to be performed by the UE during the time interval, the first type of communication being associated with the second service. The method may include adjusting, based at least in part on identifying that the first type of communication is to be performed, at least one of the first priority or the second priority during the time interval. The method may include performing, by the UE, during the time interval and at different times, communications associated with the first and the second service, including the first type of communication, in accordance with the adjusted at least one of the first priority or the second priority.

Some aspects described herein relate to a non-transitory computer-readable medium that stores a set of instructions for wireless communication by a UE. The set of instructions, when executed by one or more processors of the UE, may cause the UE to initiate a first service, having a first priority during a time interval, associated with a first SIM of the UE. The set of instructions, when executed by one or more processors of the UE, may cause the UE to initiate a second service, having a second priority during the time interval, associated with a second SIM of the UE, wherein the first service and the second service are active at the same time, the first priority having a higher priority than the second priority. The set of instructions, when executed by one or more processors of the UE, may cause the UE to identify a first type of communication to be performed by the UE during the time interval, the first type of communication being associated with the second service. The set of instructions, when executed by one or more processors of the UE, may cause the UE to adjust, based at least in part on identifying that the first type of communication is to be performed, at least one of the first priority or the second priority during the time interval. The set of instructions, when executed by one or more processors of the UE, may cause the UE to perform during the time interval and at different times, communications associated with the first and the second service, including the first type of communication, in accordance with the adjusted at least one of the first priority or the second priority.

Some aspects described herein relate to an apparatus for wireless communication. The apparatus may include means for initiating a first service, having a first priority during a time interval, associated with a first SIM of the apparatus. The apparatus may include means for initiating a second service, having a second priority during the time interval, associated with a second SIM of the apparatus, wherein the first service and the second service are active at the same time, the first priority having a higher priority than the second priority. The apparatus may include means for identifying a first type of communication to be performed by the apparatus during the time interval, the first type of communication being associated with the second service. The apparatus may include means for adjusting, based at least in part on identifying that the first type of communication is to be performed, at least one of the first priority or the second priority during the time interval. The apparatus may include means for performing during the time interval and at different times, communications associated with the first and the second service, including the first type of communication, in accordance with the adjusted at least one of the first priority or the second priority.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
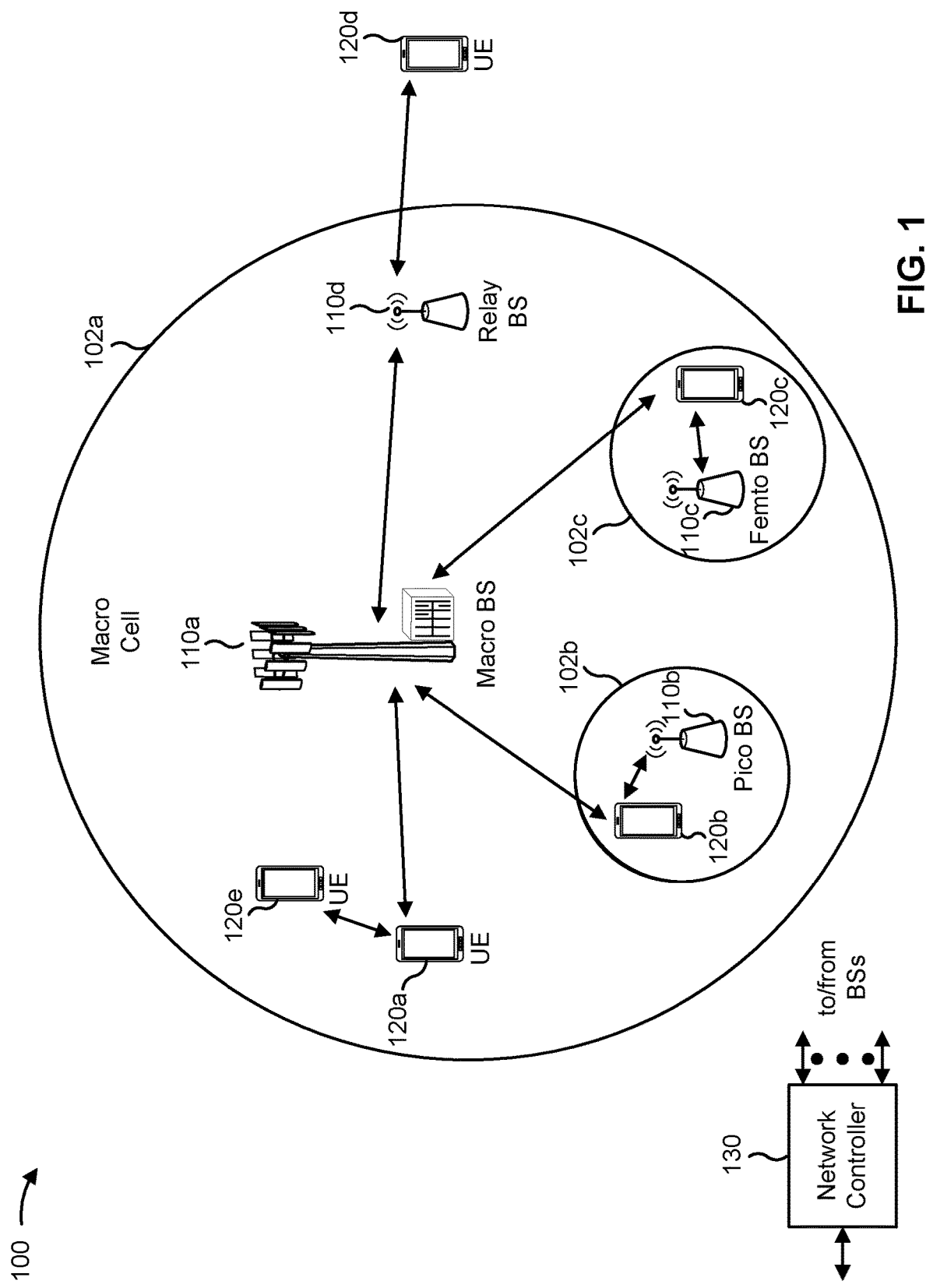
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

Deployment of communication systems, such as 5G New Radio (NR) systems, may be arranged in multiple manners with various components or constituent parts. In a 5G NR system, or network, a network node, a network entity, a mobility element of a network, a radio access network (RAN) node, a core network node, a network element, a base station, or a network equipment may be implemented in an aggregated or disaggregated architecture. For example, a base station (such as a Node B (NB), evolved NB (eNB), NR base station (BS), 5G NB, gNodeB (gNB), access point (AP), transmit receive point (TRP), or cell), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station may be configured to utilize a radio protocol stack that is physically or logically integrated within a single RAN node (for example, within a single device or unit). A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also may be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that may be individually deployed. A disaggregated base station may include functionality implemented across two or more units at various physical locations, as well as functionality implemented for at least one unit virtually, which may enable flexibility in network design. The various units of the disaggregated base station may be configured for wired or wireless communication with at least one other unit of the disaggregated base station.

As indicated above, FIG. 1 is provided as an example. Other examples may differ from what is described with regard to FIG. 1.

Figure 2:
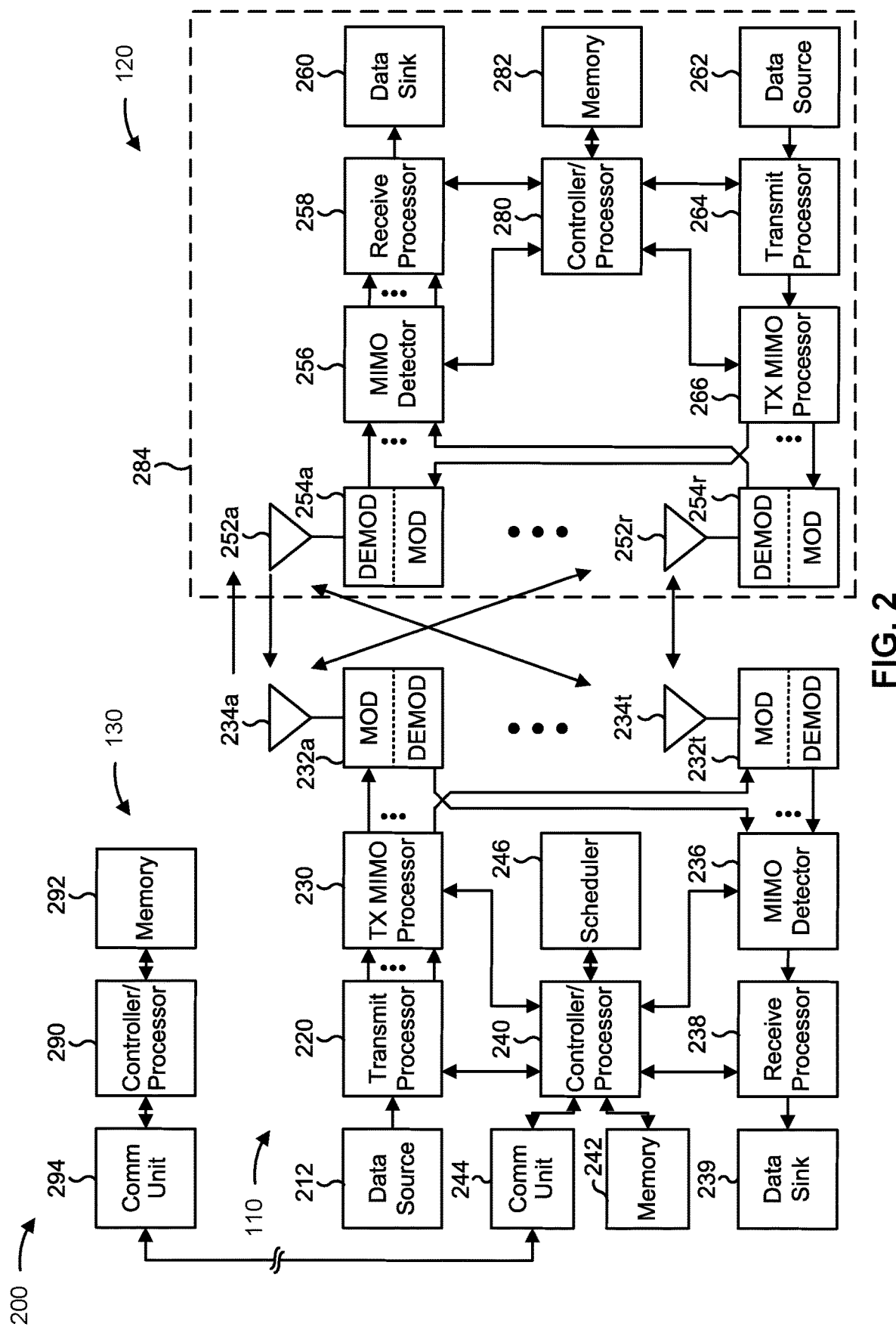
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, an/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with dual active subscriber transmit sharing, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions.

In some aspects, the UE includes means for initiating a first service, having a first priority during a time interval, associated with a first subscriber identification module (SIM) of the UE; means for initiating a second service, having a second priority during the time interval, associated with a second SIM of the UE, wherein the first service and the second service are active contemporaneously, the first priority having a higher priority than the second priority; means for identifying a first type of communication associated with the second SIM; means for adjusting, based at least in part on the first type of communication, at least one of the first priority or the second priority during the time interval; and/or means for performing a communication in accordance with the adjusted at least one of the first priority or the second priority. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for prioritizing the control or signaling transmission based at least in part on a transmission cancellation counter of the control or signaling transmission satisfying a threshold.

In some aspects, the UE includes means for obtaining, during the first window, one or more packets associated with a QoS level from a buffer, wherein the one or more packets are QoS based traffic; and/or means for transmitting the one or more packets.

In some aspects, the UE includes means for obtaining, during a time window associated with the second priority, one or more non-QoS packets, wherein the one or more non-QoS packets are best-effort traffic; and/or means for transmitting the one or more non-QoS packets.

In some aspects, the UE includes means for determining a threshold for a transmit recovery procedure associated with failed scheduling request attempts, wherein the threshold is defined based at least in part on a grant cancellation ratio, and wherein adjusting the at least one of the first priority or the second priority during the time interval is based at least in part on the threshold.

In some aspects, the UE includes means for performing the transmit recovery procedure based at least in part on the grant cancellation ratio satisfying the threshold.

In some aspects, the UE includes means for maintaining a current value of an SR attempt counter based at least in part on the one or more SRs being dropped due to the transmit resource sharing scheme.

As indicated above, FIG. 2 is provided as an example. Other examples may differ from what is described with regard to FIG. 2.

Figure 3:
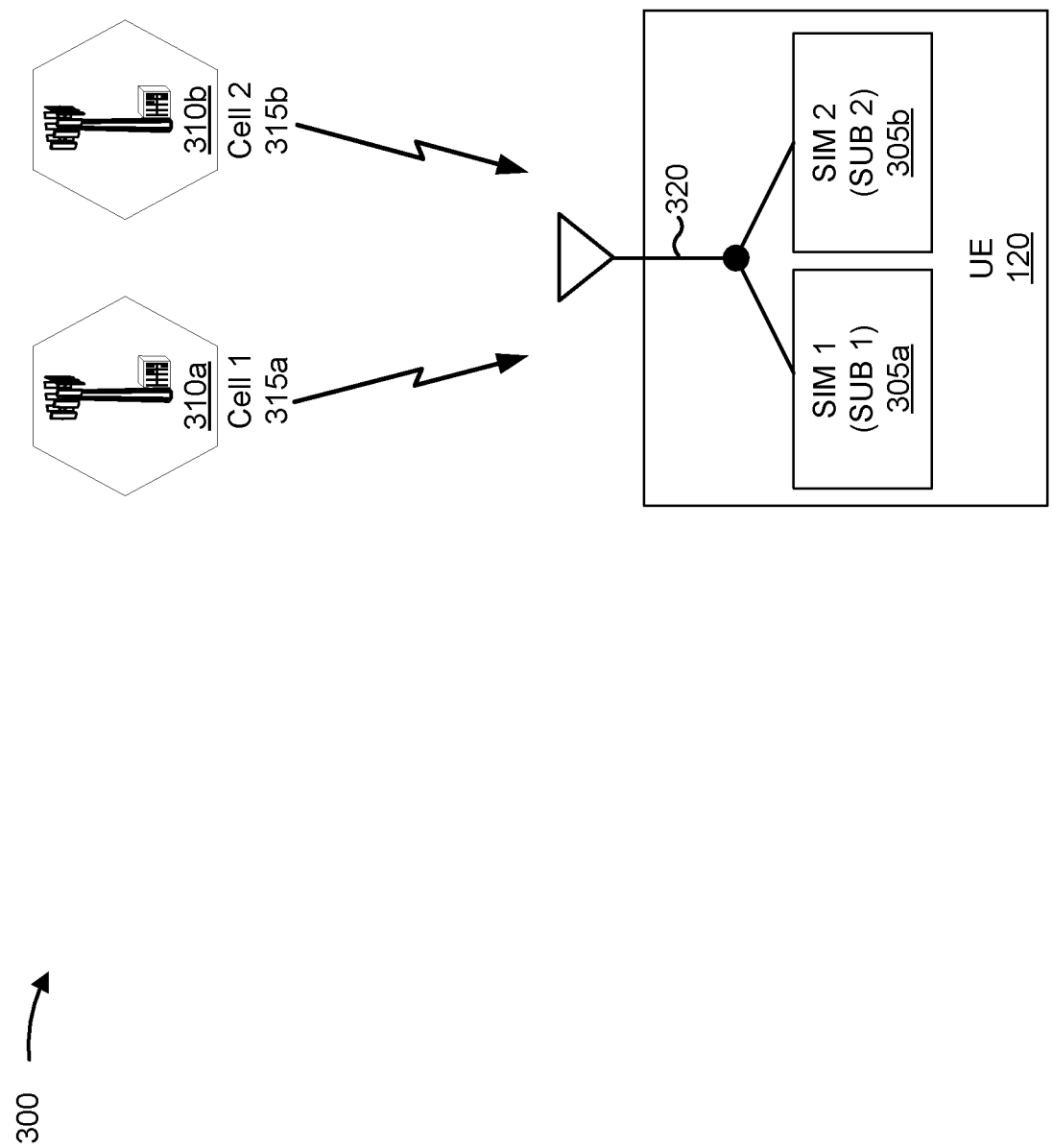
FIG. 3 is a diagram illustrating an example of a multiple subscriber identification module (multi-SIM) UE, in accordance with the present disclosure.

FIG. 3 is a diagram illustrating an example 300 of a multiple subscriber identification module (multi-SIM) UE, in accordance with the present disclosure. As shown in FIG. 3, a UE 120 may be a multi-SIM UE that includes multiple SIMs (two or more SIMs), shown as a first SIM 305a and a second SIM 305b. The first SIM 305a may be associated with a first subscription (shown as SUB 1), and the second SIM 305b may be associated with a second subscription (shown as SUB 2). A subscription may include a subscription with a network operator (for example, a mobile network operator (MNO)) that enables the UE 120 to access a wireless network (for example, a radio access network (RAN)) associated with the network operator. For example, the first SIM 305a may store a first subscriber identification, e.g., a first international mobile subscriber identity, IMSI 1, which is associated with the first subscription, and the second SIM 305b may store a different, second subscriber identification, e.g., IMSI 2, which is associated with the second subscription.

A SIM 305 may be a removable SIM (for example, a SIM card) or an embedded SIM. A SIM 305 may include an integrated circuit that securely stores an international mobile subscriber identity (IMSI) and a security key, which are used to identify and authenticate a corresponding subscription associated with the SIM 305. In some cases, a SIM 305 may store a list of services that the UE 120 has permission to access using a subscription associated with the SIM 305, such as a data service, a voice service, a video telephony service, or a gaming service, among other examples. Some of these services may be associated with Quality of Service (QoS) requirements, so associated traffic may be associated with a QoS level. Others of these services may not be associated with QoS requirements, so associated traffic may not be associated with a QoS level, or may be associated with a best-effort QoS level.

As further shown in FIG. 3, the UE 120 may communicate (for example, in a connected mode, an idle mode, or an inactive mode) with a first base station 310a via a first cell 315a (shown as Cell 1) using a subscriber identity (e.g., IMSI 1) stored on the first SIM 305a. In this case, a first subscription (SUB 1) of the UE 120 may be used to access the first cell 315a (for example, using IMSI 1 for UE identification, using a first security key for UE authentication, using a first list of services that the UE 120 is permitted to access using the first subscription, or by counting data or voice usage on the first cell against the first subscription, among other examples). Similarly, the UE 120 may communicate (for example, in a connected mode, an idle mode, or an inactive mode) with a second base station 310b via a second cell 315b (shown as Cell 2) using another subscriber identity (e.g., IMSI 2) stored on the second SIM 305b. In this case, a second subscription (SUB 2) of the UE 120 may be used to access the second cell 315b (for example, using IMSI 2 for UE identification, using a second security key for UE authentication, using a second list of services that the UE 120 is permitted to access using the second subscription, or by counting data or voice usage on the second cell against the second subscription, among other examples).

The first base station 310a and/or the second base station 310b may include one or more of the base stations 110 described above in connection with FIG. 1. Although the first cell 315a and the second cell 315b are shown as being provided by different base stations, in some aspects, the first cell 315 and the second cell 315b may be provided by the same base station. Thus, in some aspects, the first base station 310a and the second base station 310b may be integrated into a single base station.

In some cases, the UE 120 may be a multi-SIM UE, such as a dual SIM dual active (DSDA) UE, among other examples. A multi-SIM UE may be capable of switching between two separate mobile network services or contemporaneously (e.g., at the same time) using two separate mobile network services, may include hardware for maintaining multiple connections (for example, one connection per SIM) in a standby state, or may include hardware (for example, multiple transceivers) for maintaining multiple network connections at the same time, among other examples. A DSDA UE may be capable of communicating on two connections at a given time, such as for multiple communications associated with different radio access technologies (RATs) or multiple communications of a single RAT. However, limitations at UEs may force the DSDA UE to performing only a single transmission at a given time, for example, because radio frequency resources of the UE are shared between the multiple subscriptions.

For example, hardware limitations include a DSDA UE which may be associated with multiple subscriptions, but which may include only a single transceiver shared by the multiple subscriptions, a single transmit chain shared by the multiple subscriptions, a single receive chain shared by the multiple subscriptions, a baseband processing capability that only supports a single call, or a power-limited scenario, among other examples. In another example, even if a DSDA UE includes plural transceivers, plural transceiver chains, plural receive chains, and plural baseband processing capabilities, transmit power limitations include a DSDA UE which may be associated with multiple subscriptions, but which may only perform a single transmission at a given time because otherwise an excessive transmit power (e.g., exceeding an maximum permissible exposure, MPE) would be required for the communications on, e.g., two connections at a given time.

In some cases, limitations may be associated with a limited hardware resource, a limited transmit power, transmitter sharing, full concurrency power sharing, radio frequency (RF) coexistence, or the like. Such limitations on the transmit resources of the UE are shown, in a general sense, by reference number 320.

In a multi-SIM mode such as a DSDA mode, a default data SIM (DDS) subscriber may perform data activity, call activity, or the like. A non-DDS subscriber may perform call-related activity, small data activity (e.g., short message service (SMS) activity or multimedia message service (MMS) activity), or similar tasks. "Subscriber" is used interchangeably with "SIM" herein.

In some cases, a first service associated with a first subscriber and a second service associated with a second subscriber may be contemporaneously active. While the first service and the second service are contemporaneously active, the UE may be in a transmit resource limited state, such as based at least in part on full concurrency power sharing, transmitter sharing, or the like. For example, the transmit resource limited state may often arise in connection with DSDA NR+NR modem communication.

In the transmit resource limited state, a priority handling scheme may be used to allocate the limited transmit resources of the UE for transmissions associated with the first service or transmissions associated with the second service so that transmit resources of the UE are not overbooked. Typically, a priority handling scheme is a subscription service priority scheme, in which priority is allocated to one service or the other service based at least in part on a priority level associated with the service. In other words, in a subscription service priority scheme, priority may be allocated to a higher-priority service any time there is a conflict between a transmission of the higher-priority service and a transmission of a lower-priority service.

The usage of the subscription service priority scheme may lead to disproportionate impact on the lower-priority service. For example, transmissions associated with the higher-priority service may tend to be prioritized over transmissions associated with the lower-priority service. The prioritization of the higher-priority service without regard to the lower-priority service's traffic may lead to diminished throughput on the lower-priority service, failure to meet QoS requirements of the lower-priority service, and radio link failure on the connection associated with the lower-priority service. Furthermore, particular types of communications, such as scheduling requests (SRs), uplink control information (UCI), reference signaling, and the like, may be disproportionately impacted if associated with a lower priority service. The failure of SRs may lead to out-of-service determination. The failure of UCI may lead to incomplete UE-side reporting, which may lead to inefficient network configuration. The failure of reference signaling may cause a base station to improperly allocate resources to the UE or to fail to accurately estimate the channel between the base station and the UE.

Some techniques and apparatuses described herein provide priority handling schemes for a DSDA UE such that certain types of transmissions associated with a lower priority service are protected (e.g., remain operative). Thus, performance loss for a DSDA UE in transmission sharing due to a transmit resource limitation is mitigated. For example, some techniques and apparatuses described herein provide determination of a length of a priority window based at least in part on SR configurations for two SIMS whose service combination has no voice service, which improves performance of services with SR based scheduling configurations and reduces the likelihood of SR failure, thereby reducing the occurrence of an out-of-service state. Some techniques and apparatuses described herein provide for uplink physical-layer control and signaling transmission protection in order to maintain an acceptable uplink or downlink link quality, such as by protecting control or signaling transmissions associated with UCI or reference signaling (e.g., sounding reference signal (SRS) or the like) transmissions. Some techniques and apparatuses described herein provide for determination of priorities for a first service and a second service based at least in part on uplink transmission data packet flow from a different radio bearer's priority (e.g., a priority for a first service may be based at least in part on a transmission data packet flow for a second service). Some techniques and apparatuses described herein provide faster transmit starving recovery from an out-of-sync state between a UE and a base station, where the out-of-sync state is due to a lack of response to the UE's SR attempts after a transmission of the SR attempts being cancelled by resource limitation arbitration.

In this way, throughput on the lower-priority service is improved, failure to meet QoS requirements of the lower-priority service is reduced, and occurrence of radio link failure on the connection associated with the lower-priority service is reduced. Furthermore, particular types of communications, such as SRs, UCI, reference signaling, and the like, are protected when associated with a lower priority service, which hastens out-of-service determination (thereby enabling quicker recovery), more accurate UE-side reporting, and improved channel estimation.

As indicated above, FIG. 3 is provided as an example. Other examples may differ from what is described with regard to FIG. 3.

Figure 4:
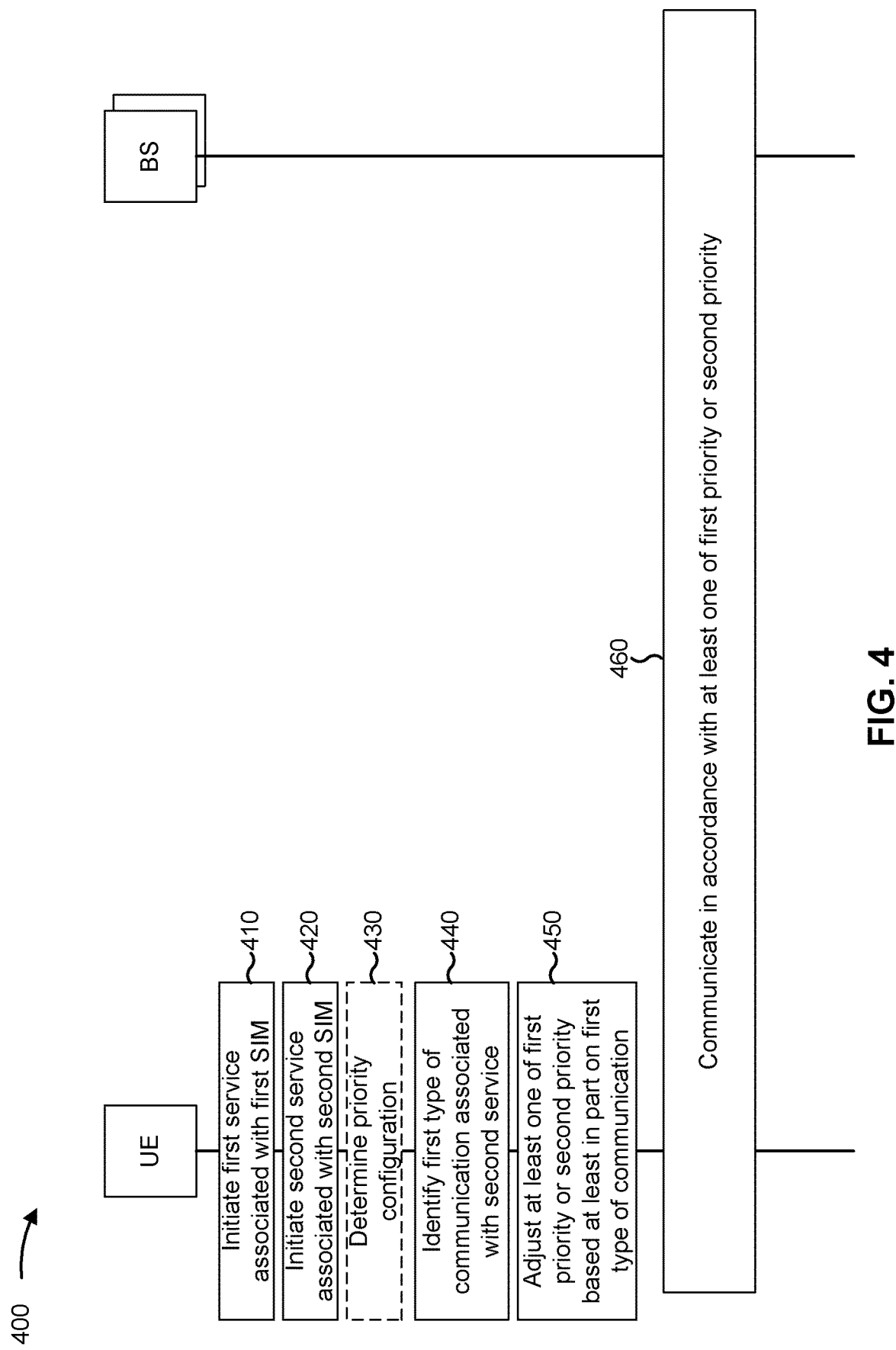
FIG. 4 is a diagram illustrating an example of signaling associated with dual active subscriber transmit sharing, in accordance with the present disclosure.

FIG. 4 is a diagram illustrating an example 400 of signaling associated with dual SIM dual active (DSDA) UE performing transmit sharing, in accordance with the present disclosure. As shown, example 400 includes a UE and a BS. As shown, example 400 includes a UE (e.g., UE 120, the UE of FIG. 3, a DSDA UE) and a BS (e.g., BS 110). In some aspects, the BS of FIG. 4 may represent a plurality of BSs (e.g., BS 310a and 310b) and/or cells (e.g., cells 315a and 315b). In some aspects, the BS of FIG. 4 may represent one of BS 310a and 310b or cells 315a and 315b. In some aspects, the base station may be implemented in a disaggregated fashion, such as including one or more central units (CUs), one or more distributed units (DUs), one or more radio units (RUs), or a combination thereof. References to "base station" can refer to one or more CUs, one or more DUs, one or more RUs, or a combination thereof. Optional steps of example 400 are indicated by dashed lines.

As shown by reference number 410, the UE may initiate a first service associated with a first SIM of the UE. For example, the UE may establish a connection associated with the first service, may initiate a call associated with the first service, may initiate a session associated with the first service, or the like. In some aspects, the first service may be a voice service. If the first service is a voice service, the first service may be managed by an IP multimedia subsystem (IMS) component of the UE. In some aspects, the first service may be a non-voice service. For example, the first service may be a gaming service, a video telephony service, a data communication service, or the like. In some aspects, the first service may be associated with a first priority. If the first service is a data communication service, the service may be managed by an evolved packet system (EPS) or a 5G system (5GS) component of the UE. The first SIM can be associated with a DDS or can be a non-DDS SIM.

As shown by reference number 420, the UE may initiate a second service associated with a second SIM of the UE. For example, the UE may establish a connection associated with the second service, may initiate a call associated with the second service, may initiate a session associated with the second service, or the like. In some aspects, the second service may be a voice service. If the second service is a voice service, the second service may be managed by an IMS component of the UE. In some aspects, the second service may be a non-voice service. For example, the second service may be a gaming service, a video telephony service, a data communication service, or the like. In some aspects, the second service may be associated with a second priority. The second SIM can be associated with a DDS or can be a non-DDS SIM.

As shown by reference number 430, the UE may optionally determine a priority configuration. The priority configuration may indicate one or more higher priority time windows (e.g., one or more symbols or slots) and one or more lower priority time windows within a time interval for the first service (equivalently, the first SIM), and may indicate one or more higher priority time windows and one or more lower priority time windows within the time interval for the second service (equivalently, the second SIM). In some aspects, the time interval may be periodic. During a higher priority time window of a given service, communications of the given service are prioritized over other communications (such as communications of another service). During a lower priority time window of the given service, communications of the given service are deprioritized relative to other communications. For example, during a lower priority time window, communications of the given service may be transmitted only if such communications do not overlap in time with higher priority communications (such as communications associated with a higher priority time window). In some aspects, a higher priority time window of the first service may at least partially overlap, in time, with a lower priority time window of the second service. In some aspects, a higher priority time window of the second service may at least partially overlap, in time, with a lower priority time window of the first service.

As shown by reference number 440, the UE may identify a first type of communication to be performed by the UE during the time interval. The first type of communication is associated with the second SIM (e.g., the second service). For example, the UE may determine that a communication of the first type of communication is to be transmitted. As shown by reference number 450, the UE may adjust at least one of the first priority or the second priority based at least in part on identifying that the first type of communication is to be performed (e.g., that the first type of communication is to be transmitted). The determination that the communication is to be transmitted, and the adjustment of the first priority and/or the second priority, are described below.

In some aspects, the first type of communication to be transmitted may be a scheduling request (SR). For example, the first service and the second service may be associated with scheduling-request-based scheduling configurations (e.g., configurations for scheduling request resources, such as configurations through higher layer signaling information element SchedulingRequestResourceConfig). In this case, the first service and the second service may be non-voice services. The UE may adjust at least one of the first priority or the second priority based at least in part on the first type of the communication being an SR. For example, to adjust the at least one of the first priority or the second priority, the UE may determine a cycle length (e.g., a length of a time interval) of a priority configuration based at least in part on one or more SR configurations, such as an SR configuration associated with the first service and/or an SR configuration associated with the second service. More specifically, the UE may determine the cycle length such that at least one SR occasion associated with the second service falls into a time window associated with the first priority. For example, for a priority configuration with a fixed ratio of a duration of a window associated with the first priority to a duration of a window associated with the second priority, a time interval of the priority configuration may be determined such that the duration of the window associated with the first priority is equal to or larger than a maximum scheduling request periodicity.

Consider a first service with a first SR periodicity of HP SR Periodicity and a second service with a second SR periodicity of LP SR Periodicity. For this example, the second priority is associated with a duration of LowPriorityDur and the first priority is associated with a duration of HighPriorityDur, and a priority configuration of the UE is associated with a time interval of a length Cycle_Length. The following pseudo-code indicates how to determine a length of a time interval of the priority configuration.

Cycle_Length=40 ms (initial or preconfigured);
If LP SR periodicity>HighPriorityDur (for the LP Sub).
Cycle_Length_Adjusted=round(Cycle_Length/HighPriorityDur)*LP SR periodicity Thus, if a scheduling request periodicity of the second SIM (e.g., LP SR periodicity) is less than or equal to a duration of a window associated with the first priority ("HighPriorityDur (for the LP Sub)") for the second SIM, the time interval is configured to have a length (Cycle_Length_Adjusted) based at least in part on dividing an initial length of the time interval (Cycle_Length) by the duration of the window associated with the first priority for the second SIM. This ensures that the time interval is of sufficient length to include an SR occasion in each window associated with the first priority for the second SIM. In some aspects, the duration of the window associated with the first priority for the second SIM may have a fixed ratio relative to the time interval. Thus, if the time interval is lengthened, the duration of the window associated with the first priority for the second SIM may be lengthened proportionately.

In some aspects, if a maximum scheduling request periodicity of the UE is less than or equal to a duration of a window associated with the second priority for the second service, the window associated with the first priority is configured to have a length greater than the maximum scheduling request periodicity, and a length of the time interval is configured as a default value. In some aspects, if the first service is associated with a first scheduling request periodicity and the second service is associated with a second scheduling request periodicity, and if the second scheduling request periodicity is greater than or equal to a ratio of a duration of the window associated with the second priority and a length of the time interval, multiplied by the first scheduling request periodicity, the length of the time interval is determined based at least in part on combining the length of the time interval and the second scheduling request periodicity and dividing the combination by the duration of the window associated with the second periodicity. In some aspects, the first service is associated with a first scheduling request periodicity and the second service is associated with a second scheduling request periodicity, and, if a ratio of a duration of the length of the window associated with the second priority and the duration of the time interval, multiplied by the first scheduling request periodicity, is less than the second scheduling request periodicity, the duration of the time interval is determined based at least in part on combining the duration of the time interval and the first scheduling request periodicity and dividing the combination by the length of the window associated with the first priority. In this way, the higher priority window for a given service is configured to include an SR occasion for the given service, which improves the likelihood that the SR occasion is successfully transmitted.

In some aspects, the first type of communication may be an uplink control information (UCI) or resource signal (RS) transmission. For example, the first type of communication may be or include a channel state information (CSI) report, a sounding reference signal (SRS), a hybrid automatic repeat request (HARQ) message (e.g., a HARQ acknowledgment (HARQ-ACK)), or the like. In this case, in some aspects, the UE may determine a periodicity for the UCI or RS transmission. For example, the UE may determine the periodicity as a maximum of a configured periodicity (such as via radio resource control (RRC) signaling or the like) and a lower bound. For example, the lower bound may be signaled to the UE, may be pre-configured, may be determined by the UE, or the like. In this way, the UE may reduce the occurrence of conflict with other transmissions.

In some aspects, the UE may adjust a first priority (e.g., a higher priority) based at least in part on a transmission cancellation counter. A transmission cancellation counter may indicate a number of consecutive transmissions, of a certain type of communication and associated with a certain service, that have been cancelled. In some aspects, the UE may maintain a respective transmission cancellation counter for one or more different types of communications associated with a given service. For example, the UE may maintain respective transmission cancellation counters for a CSI report, an SRS for codebook transmission, an SRS for antenna switching transmission, a HARQ-ACK transmission, or the like. Each time a type of communication is transmitted without cancellation (i.e., successfully), the UE may reset the corresponding transmission cancellation counter to an initial value (e.g., 0). If a transmission cancellation counter of a given type satisfies a threshold (e.g., a predefined threshold, a configurable threshold, or the like), the UE may adjust a priority configuration such that a next transmission of the given type of transmission is prioritized. If a next transmission of a given type of transmission is prioritized, the next transmission is prioritized over other communications (such as communications of another service). For example, the UE may receive or generate an override request pertaining to the next transmission or the given type of transmission, and may adjust the priority configuration based at least in part on the override request. This may be referred to herein as a dynamic arbitration scheme. In this way, the likelihood of success of the given type of transmission is improved, thereby improving throughput and performance of a deprioritized service.

In some aspects, a type of communication of the first service may be associated with a first transmission cancellation counter and a type of communication of the second service may be associated with a second transmission cancellation counter. Thus, there may be multiple channels for which the priority configuration can be adjusted across two subscribers. In such examples, the UE may adjust the priority based at least in part on a table. For example, the table may indicate respective priorities of the first service and the second service. As another example, the table may indicate respective priorities of the type of communication of the first service and the type of communication of the second service. If the UE receives or generates an override request associated with the first transmission cancellation counter and an override request associated with the second transmission cancellation counter (such as for communications in the same slot), the UE may determine a communication, of a first communication associated with the first override request and a second communication associated with the second override request, to be transmitted. For example, the UE may make that determination using the table.

In some aspects, a threshold for a transmission cancellation counter may be dynamically determined by the UE. For example, the UE may determine the threshold based at least in part on a periodicity of a corresponding communication or a periodicity of a type of communication. In some aspects, the threshold may be based at least in part on an upper bound, which prevents overly frequent overriding of the priority for communications with a small periodicity. In one example, the threshold may be determined as Threshold=MIN(round(missing_duration_ms/RRC configured periodicity in ms), upper_bound_threshold), wherein missing_duration_ms may be set independently or differently for each type of communication that is subject to a transmission cancellation counter.

In some aspects, a communication of a given type may occupy multiple slots (e.g., two or more slots). In this case, if the threshold for the transmission cancellation counter for the given type of communication is set to a sufficiently low number, then the transmission cancellation counter may be triggered for a single missed communication that occupies multiple slots. In some aspects, the threshold may be based at least in part on a random or pseudo random procedure. For example, the UE may randomly adjust the threshold (e.g., threshold, threshold+1, threshold+2, or the like) such that adjustment of the priority is not always triggered by a single dropped multi-slot communication. In some aspects, the transmission cancellation counter may reset only when a signal is out (e.g., a signal strength is below a threshold, the UE is out of service, etc.) without a transmission.

Figure 5:
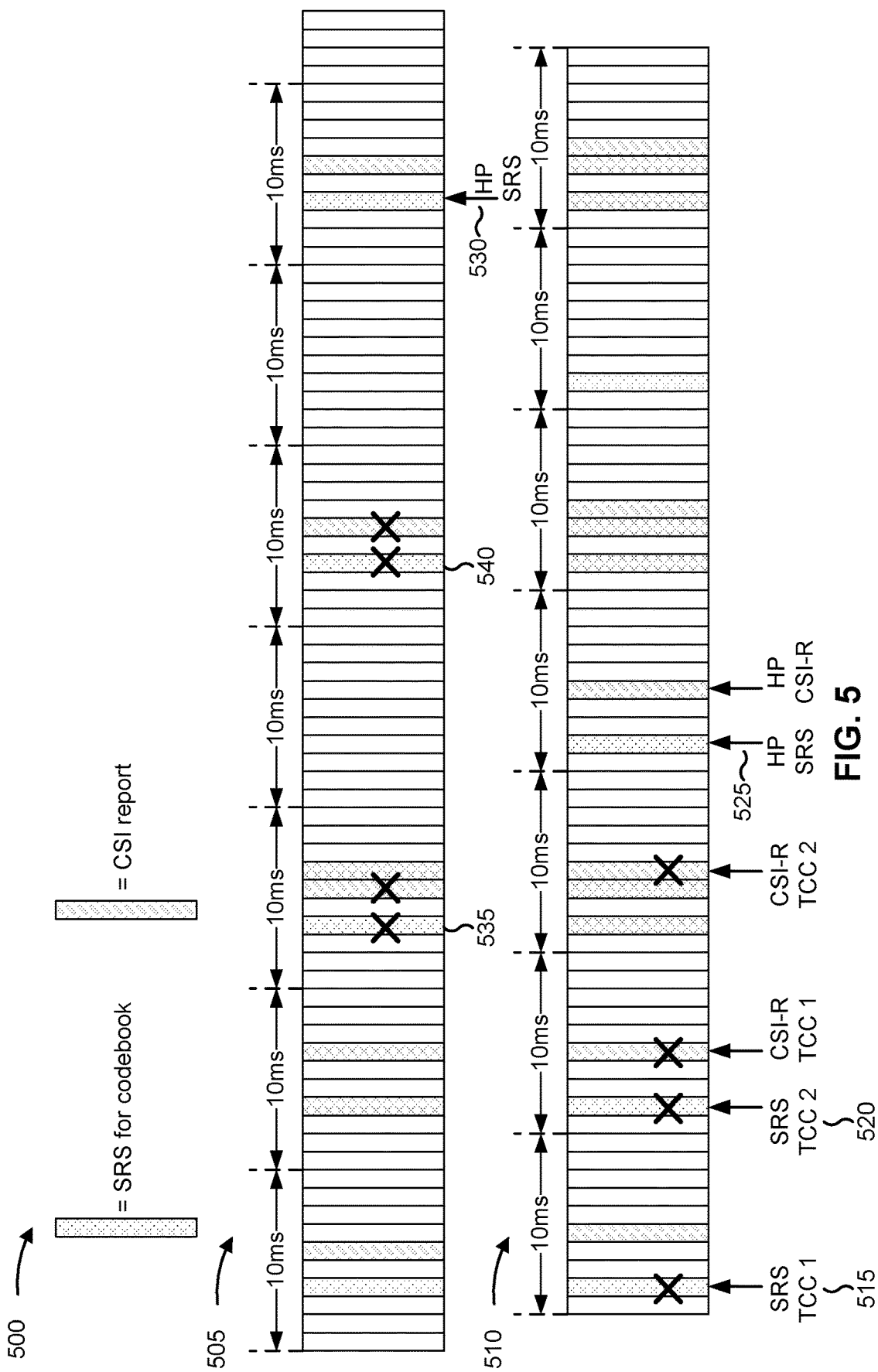
FIG. 5 is a diagram illustrating an example of a dynamic arbitration scheme, in accordance with the present disclosure.

FIG. 5 is a diagram illustrating an example 500 of a dynamic arbitration scheme, in accordance with the present disclosure. FIG. 5 shows communications associated with a first service 505 and a second service 510 across a plurality of slots. Example 500 uses a transmission cancellation threshold of 2 for both services. Thus, if two consecutive transmissions of a certain type are cancelled, the UE may prioritize a next transmission of the certain type irrespective of a priority configuration, e.g., irrespective of the priority associated with the service, over other communications (such as communications of another service). For example, reference number 515 and 520 show two consecutive cancelled SRS transmissions, which are associated with transmission cancellation counter (illustrated as "TCC") values of 1 and 2. Thus, a next SRS transmission 525 on the second service 510 is associated with an adjusted (high) priority irrespective of whether the SRS transmission 525 is in a higher priority time window or a lower priority time window for the second service 510. A similar occurrence can be seen for the first service 505, in which an SRS is transmitted with an adjusted (high) priority at reference number 530 based at least in part on two consecutive cancelled SRS transmissions shown by reference numbers 535 and 540. Thus, prioritization of a particular type of communication is ensured irrespective of a priority configuration of the UE. Thereby, the dynamic arbitration scheme may protect a particular type of communication when the particular type of communication is associated with a lower priority. As indicated above, FIG. 5 is an example. Other examples may differ from what is described with regard to FIG. 5.

Returning to FIG. 4, in some aspects, the first type of communication may be a communication associated with a lower priority level, such as communications associated with a best-effort or non-QoS traffic type. In some aspects, the UE may be associated with a first type of communication having a first priority, such as a communication with a QoS level or QoS based traffic (e.g., voice traffic, video telephony traffic, a signaling radio bearer, or the like) and a second type of communication associated with a lower priority than the first type of communication, such as a best-effort communication or a non-QoS communication. In this case, the UE may transmit the second type of communication during a time window associated with a lower priority (e.g., a time window associated with the second priority) and may transmit the first type of communication during a time window associated with a higher priority (e.g., the first time window). For example, a Layer 2 or MAC entity/component of the UE may select data from non-QoS data bearers during the time window associated with the lower priority, and may select higher priority data (e.g., data with a threshold priority level based at least in part on a QoS flow identifier or the like) during the time window associated with the higher priority. Thus, the throughput of the data from non-QoS data bearers is improved in the time window associated with the lower priority, even if higher priority traffic occurs in the time window associated with the lower priority.

In some aspects, the UE may adjust a priority of a communication based at least in part on activating a conflict mode. Which conflict mode to activate may be determined based at least in part on a level of physical layer traffic that conflicts between a first service (or first subscriber) and a second service (or second subscriber). For example, the level of physical layer traffic that conflicts may be determined based at least in part on a transmit activity ratio and an uplink slot conflict ratio (for example, a static uplink slot conflict ratio), as exemplified in further detail below. Then a UE may activate the conflict mode for a first type of communication associated with a given service during a low priority time window within the time interval. For example, the conflict mode may be determined for the first type of communication during a low priority time window. The conflict mode for a given service may be determined relative to another service's transmit activity ratio and static uplink slot conflict ratio during a high priority time window of the time interval. The transmit activity ratio may indicate a ratio of transmit activity associated with a given service relative to all activity during the high priority time window. For example, the transmit activity ratio may indicate a ratio of scheduled PUSCHs associated with a given service in a high priority time window to the total number of uplink slots in the high priority time window. The transmit activity ratio may reflect the UE's data size. A larger data size may mean that the UE may request more frequent scheduling from the network. The UE may check the transmit activity ratio by comparing network-scheduled grants (as indicated by scheduled PUSCHs associated with a given service) versus the total number of configured uplink slots during the high priority time window. Thus, the UE may not need to check a buffer to determine the data size at the UE. The configured uplink slots may be defined by a TDD or FDD band uplink slot pattern. For FDD, the configured uplink slots may include all slots in the high priority time window. For TDD, the configured uplink slots may include a number of total uplink slots in the TDD pattern configuration from an RRC configuration of the UE.

The static uplink slot conflict ratio may indicate a ratio of uplink slots associated with the given service that may conflict with (e.g., designated) uplink slots for another service. Based at least in part on the conflict mode, a physical layer entity, such as a physical layer packet builder, may select data from different QoS data buffers for transmission during a low priority time window within the time interval. Higher priority data (such as voice data, video telephony (VT) data, signaling radio bearer (SRB) data, or the like) may be delayed for transmission during a high priority time window (e.g., if a particular conflict mode is active).

In some aspects, the UE may determine a conflict mode. For example, the UE operating in a time division duplexing (TDD) mode may determine whether an uplink slot RRC configuration conflict ratio (e.g., an uplink slot conflict ratio determined based at least in part on a TDD slot pattern configured via RRC configuration per subscriber, or an FDD mode) between two services exceeds a threshold (as one example, a threshold of 0.6). In a frequency division duplexing (FDD) mode, the UE may assume that the uplink slot RRC configuration conflict ratio is always equal to 1. If the uplink slot RRC configuration conflict ratio is lower than a threshold, then the UE may not activate a conflict mode. If the uplink slot RRC configuration conflict ratio satisfies the threshold, the UE may activate a first conflict mode (referred to as conflict mode 0). The UE may keep a count of how many times each conflict mode, of a plurality of conflict modes, has been activated for a given service. For example, the UE may keep separate counters per conflict mode and per service. The UE may track transmission activity of each service during each service's high priority time window (e.g., time window associated with a first priority). For example, the UE may count physical uplink shared channel (PUSCH) transmissions during each high priority time window (such as via a parameter high_prio_pusch_scheduled). The UE may determine a transmit activity ratio as: tx_activity_ratio=high_prio_pusch_scheduled/total_high_prio_ul_slots, where total_high_prio_ul_slots includes all configured uplink slots for PUSCH transmission of a given service. At the end of a high priority time window for a given service, the UE may check a transmit activity ratio for another service, and may determine a conflict mode accordingly. For example, at the end of a high priority time window for a first service Sub 1, the UE may determine a conflict mode based at least in part on a transmit activity ratio for a second service Sub2 as shown below:

If (Sub1 next scheduled slot is within low priority time window)
{
    If Sub2 high priority transmit activity ratio*Sub 1 uplink (UL) slot conflict ratio>0.9 (configurable) in number of consecutive times (configurable, default can be set to 2) conflict_mode=fourth conflict mode (conflict mode 3)
    Else if Sub2 high priority transmit activity ratio*Sub 1 UL slot conflict ratio>0.5 (configurable) in number of consecutive times (configurable, default can be set to 2) conflict_mode=third conflict mode (conflict mode 2)
    Else if Sub2 high priority transmit activity ratio*Sub 1 UL slot conflict ratio>0.1 (configurable) in number of consecutive times (configurable, default can be set to 2) conflict_mode=second conflict mode (conflict mode 1)
    Else if Sub2 high priority transmit activity ratio*Sub 1 UL slot conflict ratio>0 (configurable) in number of consecutive times (configurable, default can be set to 3) conflict_mode=first conflict mode (conflict mode 0)
    Else
        Keep conflict_mode_unchanged.
}

As noted, the UE may determine a conflict mode, namely by determining which one of a plurality of configurable thresholds for Sub2 high priority transmit activity ratio*Sub 1 UL slot conflict ratio, and the number of consecutive times such thresholds is satisfied. Then, the UE may activate the determined conflict mode as follows: In the first conflict mode, the UE may not delay higher priority packet transmission (e.g., may not delay selection of packets associated with a high priority level until a high priority time window). In the second conflict mode, the UE may delay selection of high priority data (e.g., voice data, VT data, etc.) until a next high priority time window of Sub 1. In the third conflict mode, the UE may delay selection of high priority data until a high priority time window of Sub 1, may select low priority data during the low priority time window (e.g., a time window of a second priority) of Sub 1, and may throttle a buffer status report to exclude the high priority data during the low priority time window. In the fourth conflict mode, the UE may delay selection of all data (e.g., may not select high priority data or low priority data) until a high priority time window of Sub 1, and may report a buffer status of 0 during a low priority time window of Sub 1.

In some aspects, the first type of communication may be a scheduling request (SR), and the adjustment of the first priority or the second priority may be based at least in part on a threshold for a transmit recovery procedure associated with an out-of-synchronization (out-of-sync or OOS) state of the UE. An OOS state may be caused by transmission starving. "Transmission starving" refers to a state in which the UE has insufficient uplink grants for transmission of communications associated with a service, for example, due to the BS failing to receive one or more SRs or the BS penalizing the UE, as described below. After a threshold number of failed SR attempts (determined based at least in part on a failure to receive a grant in response to the SR attempts), the UE may determine an OOS state, and may perform a random access procedure (e.g., a contention based random access (CBRA) procedure) to recover from the OOS state by re-synchronizing with the BS. For example, a failed SR attempt may be caused by the network stopping responding to the UE's SR requests due to penalization. For example, the network may penalize the UE based at least in part on the UE reporting a non-zero buffer status report in an SR and then not utilizing a subsequent uplink grant due to consecutive cancellations of uplink transmissions on the subsequent uplink grant. However, accruing the threshold number of failed SR attempts may take a significant amount of time, during which the UE may be unable to transmit on the service.

Techniques and apparatuses described herein enable the UE to determine transmission starving based at least in part on an SR attempt counter. The UE may maintain the SR attempt counter in order to trigger a determination of transmission starving. For example, once a threshold number of SR attempts (counted by the SR attempt counter) is observed, the UE may determine that transmission starving is occurring. In some aspects, the threshold number of SR attempts may be a threshold number of failed SR attempts (such as a threshold number of SR transmissions in which the UE does not receive a corresponding uplink grant). In some aspects, the threshold number of SR attempts may be lower than a threshold for a transmit recovery procedure. The UE may skip incrementing the SR attempt counter if the SR is dropped due to a conflict with a higher priority transmission, such as due to a transmit resource limitation. By skipping the incrementing of a SR attempt counter, the UE may reduce the likelihood that an OOS state is determined due solely to prioritization of traffic across multiple services. Furthermore, the UE may maintain an uplink grant cancellation ratio. An uplink grant cancellation ratio may indicate a ratio of occasions where the BS has scheduled the UE with an uplink grant that is unused by the UE for data transmission (such as due to a conflict with another service), to a total number of grants provided to the UE. For example, a high uplink grant cancellation ratio (close to 1) may indicate that many transmissions of the UE are being cancelled due to conflict with higher priority transmissions by the UE for another service, whereas a low uplink grant cancellation ratio (close to 0) may indicate that the UE uses the majority of uplink grants provided to the UE. In some aspects, the UE may determine the uplink grant cancellation ratio based at least in part on a time window, such as a last X ms (e.g., 200 ms or a different value).

If the uplink grant cancellation ratio satisfies a threshold, then the UE may initiate a random access procedure. For example, the UE may determine an OOS state based at least in part on the uplink grant cancellation ratio satisfying a threshold (in addition to or as an alternative to the SR attempt counter). The UE may initiate the random access procedure to re-synchronize with the base station to recover from transmit starvation. In this case, the initiation of the random access procedure may be accelerated relative to a determination of an OOS state based only on a maximum number of SR attempts configured for the UE, which improves the speed of recovery from the OOS state, thereby increasing throughput on a lower priority service. In some aspects, the random access procedure may use an incremented transmit power. For example, a physical random access channel (PRACH) message (preamble transmission) of the random access procedure, after early termination of SR attempts due to the uplink grant cancellation ratio, may use an elevated or incremented transmit power (e.g., based at least in part on a prioritized PRACH procedure or the like).

Figure 6:
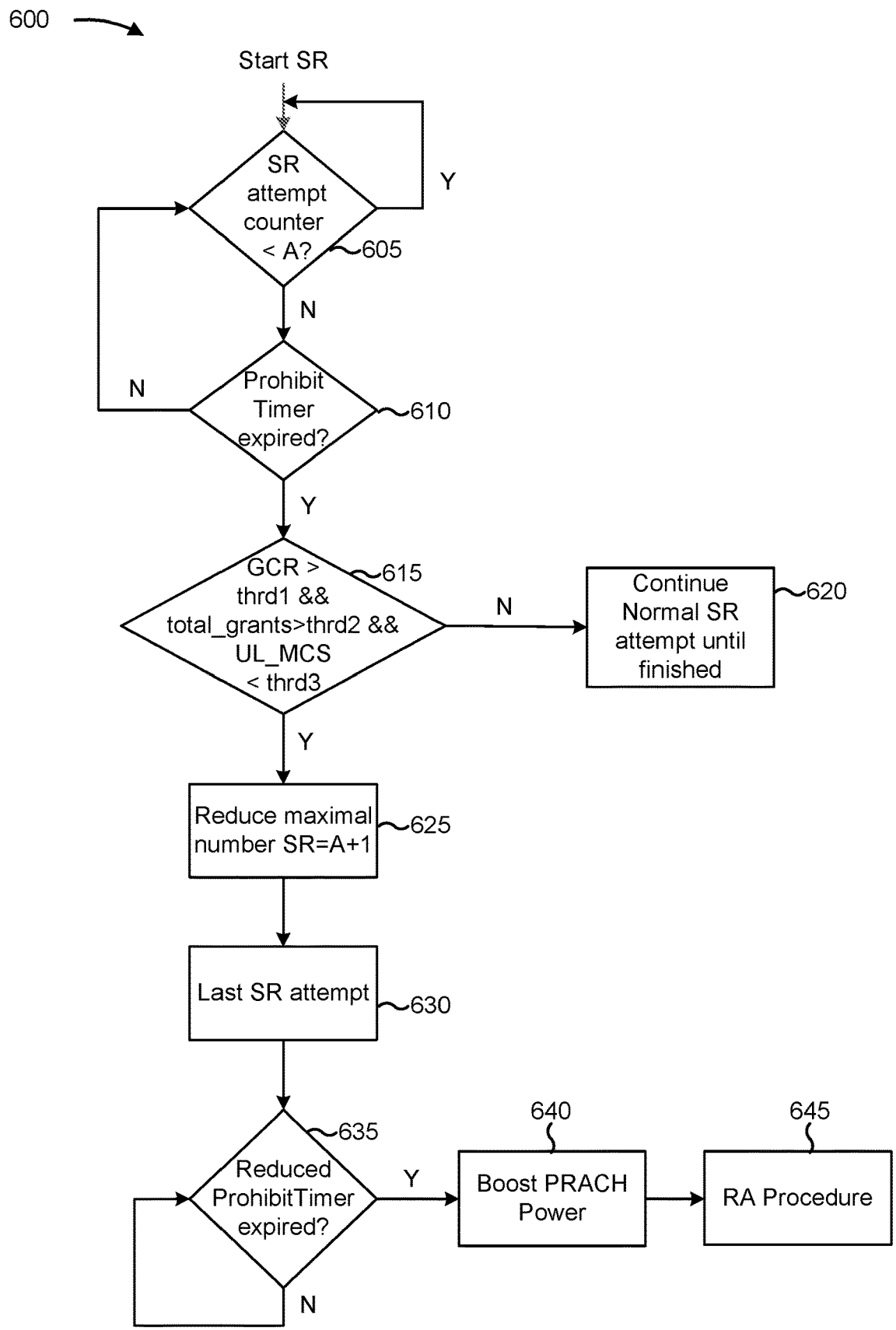
FIG. 6 is a diagram illustrating an example process associated with recovery from an out-of-synchronization state based at least in part on a grant cancellation ratio, in accordance with the present disclosure.

FIG. 6 is a diagram illustrating an example process 600 associated with recovery from an OOS state based at least in part on an uplink grant cancellation ratio, in accordance with the present disclosure. The operations of FIG. 6 may be performed by a UE (e.g., UE 120, the UE 120 of FIG. 3). In FIG. 6, A represents a threshold associated with an SR attempt counter, thrd1 represents a threshold associated with a grant cancellation ratio (GCR), thrd2 represents a threshold associated with a total number of grants received by the UE, and thrd3 represents a modulation and coding scheme (MCS) threshold, as described below. In some aspects, the SR attempt counter may be based at least in part on failed SR attempts. A failed SR attempt involves the transmission of an SR without receiving an uplink grant in response to the SR. Thus, a UE may determine a failed SR attempt if the UE transmits an SR and then does not receive corresponding uplink grant, such as due to the BS penalizing the UE for not utilizing a prior uplink grant (due to a collision between the prior uplink grant and another of the UE). In some other aspects, the SR attempt counter may be based at least in part on a number of SR attempts, irrespective of whether the SR attempts are failed SR attempts.

At block 605, the UE may determine whether the SR attempt counter is less than A. A may represent a predefined SR count threshold for a transmit starving determination trigger. For example, A may be provided from medium access control (MAC) and/or elementary files (EFS) control. The UE may trigger a transmit starving determination (e.g., an OOS state determination) if the number of SR attempts represented by the SR counter is greater than or equal to A. If the SR attempt counter is less than A (block 605—Y), then the UE may return to block 605. If the SR attempt counter is greater than or equal to A (block 605—N), then the UE may determine whether a prohibit timer has expired (block 610). A prohibit timer may prevent the UE from declaring an OOS state or transmit starvation within a particular time window of a previous declaration of an OOS state or transmit starvation. If the prohibit timer has not expired (block 610—N), then the UE may return to block 605.

If the prohibit timer has expired (block 610—Y), then the UE may determine whether one or more conditions are met (block 615). Here, the conditions include a GCR satisfying thrd1 (referred to as a grant cancellation threshold), a total number of received grants satisfying thrd2, and an uplink MCS of the UE satisfying thrd3. The GCR may identify a ratio of a physical uplink shared channel (PUSCH) grant cancellation counter due to conflict within a time window to a total number of PUSCH grants received by the UE. The PUSCH grant cancellation counter may start from a first physical downlink control channel (PDCCH) with a PUSCH grant after an SR. The PUSCH grant cancellation counter may stop after X ms (or after X*SR periodicity ms), as described above. The PUSCH grant cancellation counter may reset to the first PUSCH grant after the counter stop SR. In some aspects, thrd1 may be configurable. In one example, thrd1 may be 0.7 (e.g., 70%). By considering thrd2, the UE reduces the likelihood that the OOS state determination is triggered due to a relatively small number of grants (such as a single grant, two grants, and so on). By considering thrd3, the triggering of the OOS state determination may be made more conservative. For example, thrd3 may indicate that a last uplink MCS, or a last several uplink MCSs, should be zero, which corresponds to an out-of-range determination associated with no transmission.

If the one or more conditions are not met (block 615—N), then the UE may continue SR attempts (block 620). If the one or more conditions are met (block 615—Y), then the UE may reduce a maximum number of SR attempts to trigger the OOS state determination (block 625). For example, the UE may set the maximum number of SR attempts so that a next SR attempt triggers the OOS state determination. A maximum number of SR attempts is a configured threshold that, when satisfied, causes the UE to determine an OOS state and/or initiate a random access procedure. Thus, the UE may accelerate the OOS state determination. The maximum number of SR attempts may be referred to herein as a threshold for a transmit recovery procedure. As further shown, the UE may perform a final SR attempt (block 630) which may trigger the OOS state determination. As shown, if a prohibit timer (e.g., a reduced prohibit timer associated with the accelerated OOS state determination) is satisfied (block 635—Y), then the UE may boost a PRACH power (block 640) (such as by incrementing a preamble power ramping counter of the PRACH procedure), and may perform a random access procedure using the boosted PRACH power (block 645). As indicated above, FIG. 6 is provided as an example. Other examples may differ from what is described with regard to FIG. 6.

Returning to FIG. 4, as shown by reference number 460, the UE may perform a communication in accordance with the adjusted at least one of the first priority or the second priority. For example, the UE may transmit a communication of the first type of communication in accordance with an adjusted first priority, such that the communication is prioritized. As another example, the UE may perform one or more transmissions associated with the first service and/or the second service in accordance with a priority configuration adjusted by the UE based at least in part on the first type of communication.

In this way, techniques described herein provide determination of a length of a time window for a priority configuration based at least in part on SR configurations for two SIMs, such as two SIMS associated with a service combination that does not include a voice service. Further, techniques described herein introduce a protection scheme for uplink physical layer control and signaling transmission in order to maintain uplink/downlink link quality. Still further, techniques described herein introduce internal priority selection for L2/MAC to consume higher priority packets (such as associated with Voice over NR (VoNR), video telephony (VT), or a signaling radio bearer (SRB)) in a higher priority time window, and lower priority packets (such as associated with non-QoS data) in a lower priority time window. Even further, techniques described herein provide a faster transmit starving recovery scheme from an out-of-sync state between the UE and the BS due to a lack of response to the UE's SR attempts after the UE's transmission of the SR attempts is cancelled by resource limitation arbitration.

As indicated above, FIG. 6 is provided as an example. Other examples may differ from what is described with regard to FIG. 6.

In some aspects, the UE may perform a transmit starving recovery scheme in association with a conflict mode. For example, data may arrive for transmission, and may trigger a scheduling request (SR) transmission. If a number of SR attempts satisfies a threshold (e.g., a configurable threshold for determining that transmit starvation is occurring, referred to herein as a threshold for a transmit recovery procedure associated with failed scheduling request attempts), the UE may determine whether a conflict mode is a third or fourth conflict mode (as described herein), whether no grant is scheduled during a high priority time window (e.g., time window associated with a first priority), and if an SR is at least a threshold length of time from a start of the high priority time window. If the conflict mode is the third or fourth conflict mode, no uplink grant is scheduled during a high priority time window, and the SR is at least the threshold length of time from the start of the high priority time window, the UE may boost physical random access channel (PRACH) power and/or perform a random access procedure (such as by transmitting a PRACH message with a buffer status report). If the conflict mode is not the third or fourth conflict mode, or the uplink grant is scheduled during the high priority time window, or the SR is not at least the threshold length of time from the start of the high priority time window, the UE may continue to attempt a SR transmission for the pending SRs. The following pseudocode provides an example of performing a transmit starving recovery scheme in association with a conflict mode:

When number of SR attempts reaches configurable threshold for determining that transmit starvation is occurring.
If following condition is satisfied:
conflict_mode>1 && high_prio_pusch_scheduled==0 && sr_bad_location==true Boost PRACH power and perform random access procedure
Else continue normal SR attempt until finished.

In the above pseudocode, high_prio_pusch_scheduled indicates a number of PUSCHs scheduled during a high priority time window. "sr_bad_location" is true when an SR occasion satisfies the below condition:

((SR_occasion<high_prio_START) && (high_prio_START−SR_occasion>gamma1))||
((SR_occasion<high_prio_END) && (high_prio_END−SR_occasion<=gamma2))||
((SR_occasion>high_prio_END) && (low_prio_END−SR_occasion>gamma1)), Where
gamma1=single-SIM (SSIM) SR to PUSCH delay+10 ms,
gamma2=SSIM SR to PUSCH delay, and
SR_occasion, high_prio_START and low_prio_END are mapped to a slot number within 40 ms.

In the above pseudocode, SR_occasion indicates a time associated with an SR transmission, high_prio_START indicates a start of a high priority time window, high_prio_END indicates an end of a high priority time window, low_prio_END indicates an end of a low priority time window (e.g., a time window associated with a second priority), and conflict_mode indicates a conflict_mode (as described in connection with FIGS. 4-6). sr_bad_location is used to determine whether an SR is at least a threshold length of time away from a start of a high priority time window. For example, the UE may perform a random access procedure and/or use a boosted PRACH power based at least in part on a location of an SR being a threshold length of time from a start of a high priority time window.

Figure 7:
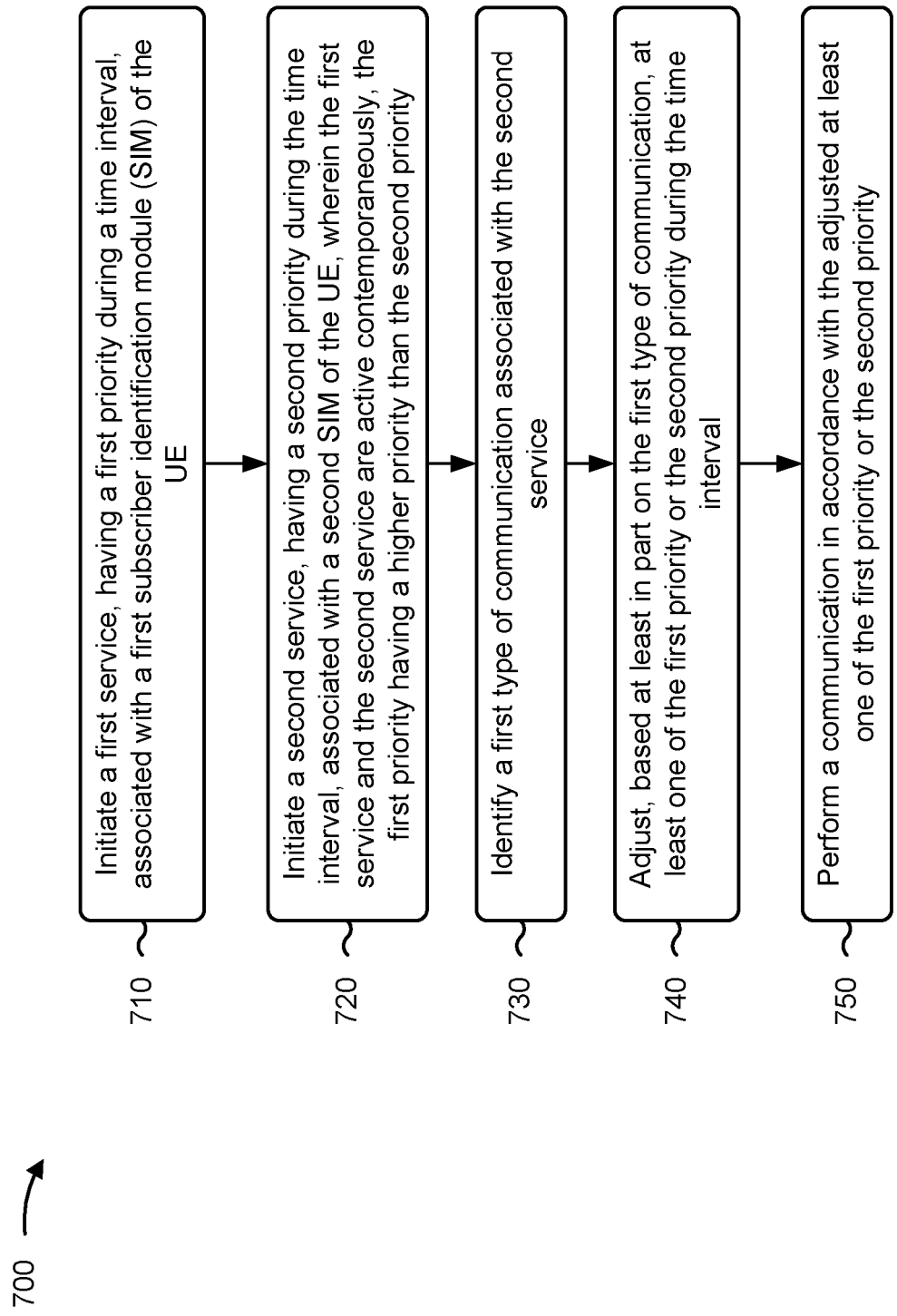
FIG. 7 is a diagram illustrating an example process performed, for example, by a UE, in accordance with the present disclosure.

FIG. 7 is a diagram illustrating an example process 700 performed, for example, by a UE, in accordance with the present disclosure. Example process 700 is an example where the UE (e.g., UE 120) performs operations associated with dual active subscriber transmit sharing.

As shown in FIG. 7, in some aspects, process 700 may include initiating a first service, having a first priority during a time interval, associated with a first SIM of the UE (block 710). For example, the UE (e.g., using subscription component 808, depicted in FIG. 8) may initiate a first service, having a first priority during a time interval, associated with a first SIM of the UE, as described above.

As further shown in FIG. 7, in some aspects, process 700 may include initiating a second service, having a second priority during the time interval, associated with a second SIM of the UE, wherein the first service and the second service are active contemporaneously, the first priority having a higher priority than the second priority (block 720). For example, the UE (e.g., using subscription component 808, depicted in FIG. 8) may initiate a second service, having a second priority during the time interval, associated with a second SIM of the UE, wherein the first service and the second service are active contemporaneously (e.g., at the same time), the first priority having a higher priority than the second priority, as described above.

As further shown in FIG. 7, in some aspects, process 700 may include identifying a first type of communication associated with the second service (block 730). For example, the UE (e.g., using identification component 810, depicted in FIG. 8) may identify a first type of communication associated with the second service (e.g., SIM), as described above. The first type of communication may be performed during the time interval.

As further shown in FIG. 7, in some aspects, process 700 may include adjusting, based at least in part on the first type of communication, at least one of the first priority or the second priority during the time interval (block 740). For example, the UE (e.g., using prioritization component 812, depicted in FIG. 8) may adjust, based at least in part on identifying that the first type of communication is to be performed, at least one of the first priority or the second priority during the time interval, as described above.

As further shown in FIG. 7, in some aspects, process 700 may include performing a communication in accordance with the adjusted at least one of the first priority or the second priority (block 750). For example, the UE (e.g., using transmission component 804, depicted in FIG. 8) may perform a communication in accordance with the adjusted at least one of the first priority or the second priority, as described above. In some aspects, the UE may perform multiple communications at different times. For example, the UE may perform multiple communications at different times during the time interval. The multiple communications may include a communication associated with the first service and a communication associated with the second service. The communications may include a communication of the first type of communication.

Process 700 may include additional aspects, such as any single aspect or any combination of aspects described below and/or in connection with one or more other processes described elsewhere herein.

In a first aspect, the first service and the second service are non-voice services.

In a second aspect, alone or in combination with the first aspect, the first service and the second service are associated with scheduling request based scheduling configurations.

In a third aspect, alone or in combination with one or more of the first and second aspects, the adjusting of the at least one of the first priority or the second priority comprises modifying a window associated with the first priority (e.g., a higher priority time window) to include at least one scheduling request occasion associated with the second SIM, wherein the first type of communication is a scheduling request. Additionally, or alternatively, in the third aspect, the first type of communication is a scheduling request, the time interval includes a first time window associated with the first priority for the second service, and the adjusting of the at least one of the first priority or the second priority comprises modifying the first time window associated with the first priority to include at least one scheduling request occasion associated with the second service.

In a fourth aspect, alone or in combination with one or more of the first through third aspects, for a priority configuration with a fixed ratio of a duration of a window associated with the first priority (e.g., a higher priority time window) to a duration of a window associated with the second priority (e.g., a lower priority time window), a time interval (e.g., a cycle length) of the priority configuration is determined such that the duration of the window associated with the first priority is equal to or larger than a maximum scheduling request occasion periodicity. Additionally, or alternatively, in the fourth aspect, the UE may determine a priority configuration indicating, for the second service, the first time window associated with the first priority and a second time window associated with the second priority, wherein the first time window and the second time window are within the time interval, and a first duration of the first time window has a fixed ratio to a second duration of the second time window; and wherein, for the priority configuration, the time interval is determined such that the first duration is equal to or larger than a scheduling request periodicity associated with the second service.

In a fifth aspect, alone or in combination with one or more of the first through fourth aspects, if a maximum scheduling request occasion periodicity of the UE is less than or equal to a duration of a window associated with the second priority, the window associated with the first priority is configured to have a length greater than the maximum scheduling request occasion periodicity, and a length of the time interval is configured as a default value. Additionally, or alternatively, in the fifth aspect, the UE may configure the time interval including, for the second service, the first time window associated with the first priority and a second time window associated with the second priority, and wherein, if a scheduling request periodicity of the second service is greater than a first duration of the first time window, the time interval is configured to have a length based at least in part on dividing a predefined length of the time interval by the first duration of the first time window.

In a sixth aspect, alone or in combination with one or more of the first through fifth aspects, the first service is associated with a first scheduling request occasion periodicity and the second service is associated with a second scheduling request occasion periodicity, and, if the second scheduling request occasion periodicity is greater than or equal to a ratio of a duration of the window associated with the second priority and a length of the time interval, multiplied by the first scheduling request occasion periodicity, the length of the time interval is determined based at least in part on combining the length of the time interval and the second scheduling request occasion periodicity and dividing the combination by the duration of the window associated with the second periodicity.

In a seventh aspect, alone or in combination with one or more of the first through sixth aspects, the first service is associated with a first scheduling request occasion periodicity and the second service is associated with a second scheduling request occasion periodicity, and, if a ratio of a duration of the length of the window associated with the second priority and the duration of the time interval, multiplied by the first scheduling request occasion periodicity, is less than the second scheduling request occasion periodicity, the duration of the time interval is determined based at least in part on combining the duration of the time interval and the first scheduling request occasion periodicity and dividing the combination by the length of the window associated with the first priority.

In an eighth aspect, alone or in combination with one or more of the first through seventh aspects, the first type of communication is an uplink control information (UCI) or reference signal (RS) transmission.

In an eighth aspect, alone or in combination with one or more of the first through seventh aspects, a periodicity of the UCI or RS transmission is determined as a maximum of a configured periodicity and a lower bound.

In a ninth aspect, alone or in combination with one or more of the first through eighth aspects, the UCI or RS transmission carries at least one of a channel state information report, a sounding reference signal, or a hybrid automatic repeat request acknowledgment message.

In a tenth aspect, alone or in combination with one or more of the first through ninth aspects, adjusting the at least one of the first priority or the second priority during the time interval is based at least in part on a transmission cancellation counter specific to the first type of communication.

In an eleventh aspect, alone or in combination with one or more of the first through tenth aspects, adjusting the at least one of the first priority or the second priority during the time interval is based at least in part on a plurality of transmission cancellation counters corresponding to respective types of communications.

In a twelfth aspect, alone or in combination with one or more of the first through eleventh aspects, the adjusting the at least one of the first priority or the second priority during the time interval further comprises prioritizing the UCI or RS transmission based at least in part on a transmission cancellation counter of the UCI or RS transmission satisfying a threshold.

In a thirteenth aspect, alone or in combination with one or more of the first through twelfth aspects, the prioritization of the UCI or RS transmission is performed by a physical layer of the UE.

In a fourteenth aspect, alone or in combination with one or more of the first through thirteenth aspects, the threshold for the transmission cancellation counter is determined based at least in part on a random or pseudo-random procedure.

In a fifteenth aspect, alone or in combination with one or more of the first through fourteenth aspects, the threshold for the transmission cancellation counter is predefined or configurable.

In a sixteenth aspect, alone or in combination with one or more of the first through fifteenth aspects, the transmission cancellation counter is one of a plurality of transmission cancellation counters, wherein one or more of the plurality of transmission cancellation counters are associated with the first service and one or more of the plurality of transmission cancellation counters are associated with the second service.

In a seventeenth aspect, alone or in combination with one or more of the first through sixteenth aspects, the transmission cancellation counter indicates a number of consecutive cancelled UCI or RS transmissions, of a particular type of communication and associated with a given service of the first service or the second service, and wherein the transmission cancellation counter is reset to an initial value when a transmission of the particular type of transmission is transmitted without cancellation for the given service.

In an eighteenth aspect, alone or in combination with one or more of the first through seventeenth aspects, adjusting the at least one of the first priority or the second priority during the time interval comprises adjusting at least one of a first window associated with QoS based traffic at the first priority or a second window associated with best-effort traffic at the second priority.

In a nineteenth aspect, alone or in combination with one or more of the first through eighteenth aspects, performing the communications further comprises obtaining, during a first time window associated with quality of service (QoS) based traffic at the first priority, one or more packets associated with a QoS level from a buffer, wherein the one or more packets are QoS based traffic; and transmitting the one or more packets.

In a twentieth aspect, alone or in combination with one or more of the first through nineteenth aspects, the one or more packets are obtained irrespective of whether the one or more packets are associated with the first service or the second service.

In a twenty-first aspect, alone or in combination with one or more of the first through twentieth aspects, the one or more packets are associated with at least one of a voice call, a video telephony call, or a signaling radio bearer.

In a twenty-second aspect, alone or in combination with one or more of the first through twenty-first aspects, performing the communication further comprises obtaining, during a second time window associated with the second priority, one or more non-QoS packets, wherein the one or more non-QoS packets are best-effort traffic, and transmitting the one or more non-QoS packets.

In a twenty-third aspect, alone or in combination with one or more of the first through twenty-second aspects, the one or more non-QoS packets are obtained irrespective of whether the one or more non-QoS packets are associated with the first service or the second service.

In a twenty-fourth aspect, alone or in combination with one or more of the first through twenty-third aspects, the first type of communication is a scheduling request.

In a twenty-fifth aspect, alone or in combination with one or more of the first through twenty-fourth aspects, process 700 includes determining a threshold for a transmit recovery procedure, wherein the threshold is defined based at least in part on an uplink grant cancellation ratio, and wherein adjusting the at least one of the first priority or the second priority during the time interval is based at least in part on the threshold.

In a twenty-sixth aspect, alone or in combination with one or more of the first through twenty-fifth aspects, the grant cancellation ratio is determined within a time window.

In a twenty-seventh aspect, alone or in combination with one or more of the first through twenty-sixth aspects, performing the communication further comprises performing the transmit recovery procedure based at least in part on the uplink grant cancellation ratio satisfying a grant cancellation threshold (e.g., thrd1).

In a twenty-eighth aspect, alone or in combination with one or more of the first through twenty-seventh aspects, the transmit recovery procedure comprises a physical random access channel (PRACH) procedure that is initiated in accordance with the grant cancellation ratio satisfying the threshold.

In a twenty-ninth aspect, alone or in combination with one or more of the first through twenty-eighth aspects, the PRACH procedure is associated with an incremented preamble power ramping counter.

In a thirtieth aspect, alone or in combination with one or more of the first through twenty-ninth aspects, process 700 includes maintaining a current value of an SR attempt counter (e.g., skipping incrementing of the SR attempt counter) based at least in part on the one or more SRs being dropped due to the transmit resource sharing scheme.

In a thirty-first aspect, alone or in combination with one or more of the first through thirtieth aspects, the transmit recovery procedure is associated with recovering from an out-of-synchronization state.

In a thirty-second aspect, alone or in combination with one or more of the first through thirty-first aspects, the transmit recovery procedure is based at least in part on a modulation and coding scheme (MCS) threshold (e.g., thld3) for an uplink communication of the UE.

In a thirty-third aspect, alone or in combination with one or more of the first through thirty-second aspects, the threshold for the transmit recovery procedure is adjustable based at least in part on the grant cancellation ratio.

In a thirty-fourth aspect, alone or in combination with the third aspect, if a scheduling request occasion periodicity of the second SIM is less than or equal to a duration of a window associated with the first priority for the second SIM, the time interval is configured to have a length based at least in part on dividing the length of the time interval by the duration of the window associated with the first priority for the second SIM.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
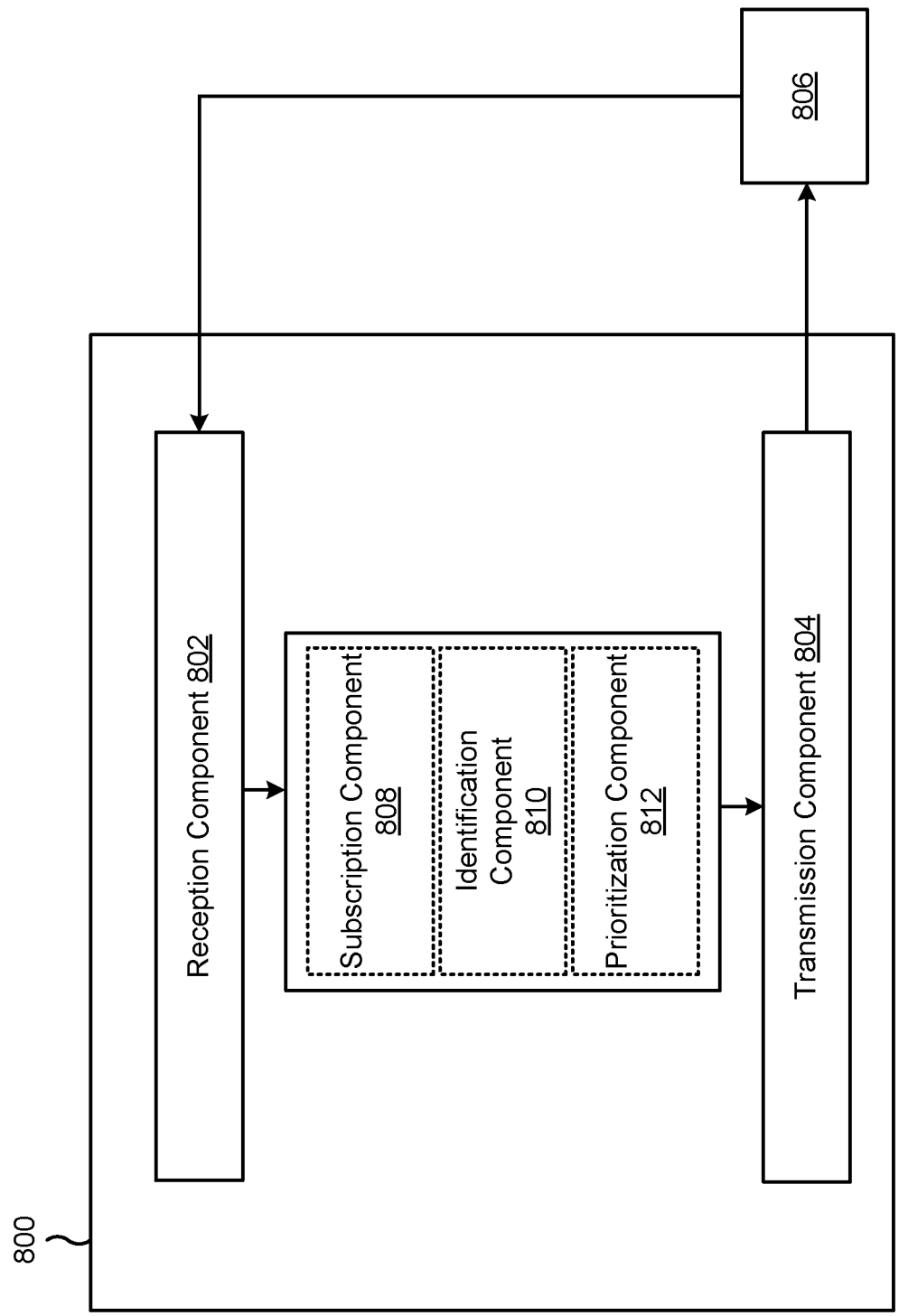
FIG. 8 is a block diagram of an example apparatus for wireless communication in accordance with the present disclosure.

FIG. 8 is a block diagram of an example apparatus 800 for wireless communication in accordance with the present disclosure. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include one or more of a subscription component 808, a identification component 810, or a prioritization component 812, among other examples.

In some aspects, the apparatus 800 may be configured to perform one or more operations described herein in connection with FIGS. 3-6. Additionally, or alternatively, the apparatus 800 may be configured to perform one or more processes described herein, such as process 600 of FIG. 6, process 700 of FIG. 7, or a combination thereof. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

The subscription component 808 may initiate a first service, having a first priority during a time interval, associated with a first SIM of the UE. The subscription component 808 may initiate a second service, having a second priority during the time interval, associated with a second SIM of the UE, wherein the first service and the second service are active contemporaneously, the first priority having a higher priority than the second priority. The identification component 810 may identify a first type of communication associated with the second SIM. The prioritization component 812 may adjust, based at least in part on the first type of communication, at least one of the first priority or the second priority during the time interval. The transmission component 804 may perform a communication in accordance with the adjusted at least one of the first priority or the second priority.

The prioritization component 812 may determine a threshold for a transmit recovery procedure associated with failed scheduling request attempts, wherein the threshold is defined based at least in part on a grant cancellation ratio, and wherein adjusting the at least one of the first priority or the second priority during the time interval is based at least in part on the threshold.

The prioritization component 812 may maintain a current value of an SR attempt counter based at least in part on the one or more SRs being dropped due to the transmit resource sharing scheme.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: initiating a first service, having a first priority during a time interval, associated with a first subscriber identification module (SIM) of the UE; initiating a second service, having a second priority during the time interval, associated with a second SIM of the UE, wherein the first service and the second service are active contemporaneously, the first priority having a higher priority than the second priority; identifying a first type of communication associated with the second SIM; adjusting, based at least in part on the first type of communication, at least one of the first priority or the second priority during the time interval; and performing a communication in accordance with the adjusted at least one of the first priority or the second priority.

Aspect 2: The method of Aspect 1, wherein the first service and the second service are non-voice services.

Aspect 3: The method of any one of Aspects 1-2, wherein the first service and the second service are associated with scheduling request based scheduling configurations.

Aspect 4: The method of any one of Aspects 1-3, wherein the adjusting of the at least one of the first priority or the second priority comprises modifying a window associated with the first priority to include at least one scheduling request occasion associated with the second SIM, wherein the first type of communication is a scheduling request.

Aspect 5: The method of Aspect 4, wherein, for a priority configuration with a fixed ratio of a duration of a window associated with the first priority to a duration of a window associated with the second priority, a time interval of the priority configuration is determined such that the duration of the window associated with the first priority is equal to or larger than a maximum scheduling request occasion periodicity.

Aspect 6: The method of Aspect 4, wherein, if a scheduling request occasion periodicity of the second SIM is less than or equal to a duration of a window associated with the first priority for the second SIM, the time interval is configured to have a length based at least in part on dividing the length of the time interval by the duration of the window associated with the first priority for the second SIM.

Aspect 7: The method of Aspect 1, wherein the first type of communication is a control or signaling transmission.

Aspect 8: The method of Aspect 7, wherein a periodicity of the control or signaling transmission is determined as a maximum of a configured periodicity and a lower bound.

Aspect 9: The method of any one of Aspects 7-8, wherein the control or signaling transmission carries at least one of: a channel state information report, a sounding reference signal, or a hybrid automatic repeat request acknowledgment message.

Aspect 10: The method of any one of Aspects 7-9, wherein adjusting the at least one of the first priority or the second priority during the time interval is based at least in part on a transmission cancellation counter specific to the first type of communication.

Aspect 11: The method of any one of Aspects 7-10, wherein adjusting the at least one of the first priority or the second priority during the time interval is based at least in part on a plurality of transmission cancellation counters corresponding to respective types of transmissions.

Aspect 12: The method of any one of Aspects 7-11, wherein the adjusting the at least one of the first priority or the second priority during the time interval further comprises: prioritizing the control or signaling transmission based at least in part on a transmission cancellation counter of the control or signaling transmission satisfying a threshold.

Aspect 13: The method of Aspect 12, wherein the prioritization of the control or signaling transmission is performed by a physical layer of the UE.

Aspect 14: The method of any one of Aspects 12-13, wherein the threshold for the transmission cancellation counter is determined based at least in part on a random or pseudo-random procedure.

Aspect 15: The method of any one of Aspects 12-14, wherein the threshold for the transmission cancellation counter is predefined or configurable.

Aspect 16: The method of any one of Aspects 12-15, wherein the transmission cancellation counter is one of a plurality of transmission cancellation counters, wherein one or more of the plurality of transmission cancellation counters are associated with the first service and one or more of the plurality of transmission cancellation counters are associated with the second service.

Aspect 17: The method of any one of Aspects 12-16, wherein the transmission cancellation counter indicates a number of consecutive cancelled control or signaling transmissions, of a type of transmission and associated with a given SIM of the first SIM or the second SIM, and wherein the transmission cancellation counter is reset to an initial value when a transmission of the type of transmission is successfully transmitted for the given SIM.

Aspect 18: The method of Aspect 1, wherein adjusting the at least one of the first priority or the second priority during the time interval comprises adjusting at least one of a first window associated with quality of service (QoS) based traffic at the first priority or a second window associated with best-effort traffic at the second priority.

Aspect 19: The method of Aspect 18, wherein performing the communication further comprises: obtaining, during the first window, one or more packets associated with a QoS level from a buffer, wherein the one or more packets are QoS based traffic; and transmitting the one or more packets.

Aspect 20: The method of Aspect 19, wherein the one or more packets are obtained irrespective of whether the one or more packets are associated with the first service or the second service.

Aspect 21: The method of any one of Aspects 19-20, wherein the one or more packets are associated with at least one of: a voice call, a video telephony call, or a signaling radio bearer.

Aspect 22: The method of any one of Aspects 19-21, wherein performing the communication further comprises: obtaining, during a time window associated with the second priority, one or more non-QoS packets, wherein the one or more non-QoS packets are best-effort traffic; and transmitting the one or more non-QoS packets.

Aspect 23: The method of Aspect 22, wherein the one or more non-QoS packets are obtained irrespective of whether the one or more non-QoS packets are associated with the first service or the second service.

Aspect 24: The method of Aspect 1, wherein the first type of communication is a scheduling request.

Aspect 25: The method of Aspect 24, further comprising: determining a threshold for a transmit recovery procedure associated with failed scheduling request attempts, wherein the threshold is defined based at least in part on a grant cancellation ratio, and wherein adjusting the at least one of the first priority or the second priority during the time interval is based at least in part on the threshold.

Aspect 26: The method of Aspect 25, wherein the grant cancellation ratio is maintained within a time window.

Aspect 27: The method of Aspect 25, wherein performing the communication further comprises: performing the transmit recovery procedure based at least in part on the grant cancellation ratio satisfying the threshold.

Aspect 28: The method of Aspect 27, wherein the transmit recovery procedure comprises a physical random access channel (PRACH) procedure that is initiated in accordance with the grant cancellation ratio satisfying the threshold.

Aspect 29: The method of Aspect 28, wherein the PRACH procedure is associated with an increased transmit power level relative to a baseline PRACH procedure.

Aspect 30: The method of Aspect 29, further comprising: maintaining a current value of an SR attempt counter based at least in part on the one or more SRs being dropped due to a transmit resource limitation.

Aspect 31: The method of Aspect 29, wherein the transmit recovery procedure is associated with recovering from an out-of-synchronization state.

Aspect 32: The method of any one of Aspects 25-31, where the transmit recovery procedure is based at least in part on a modulation and coding scheme (MCS) threshold for an uplink communication of the UE.

Aspect 33: The method of any one of Aspects 25-32, wherein the threshold associated with the one or more SRs indicates a number of failed SR transmissions, and wherein the threshold is adjustable based at least in part on the grant cancellation ratio.

Aspect 34: A method of wireless communication performed by a user equipment (UE), comprising: initiating a first service, having a first priority during a time interval, associated with a first subscriber identification module (SIM) of the UE; initiating a second service, having a second priority during the time interval, associated with a second SIM of the UE, wherein the first service and the second service are active at the same time, the first priority having a higher priority than the second priority; identifying a first type of communication to be performed by the UE during the time interval, the first type of communication being associated with the second service; adjusting, based at least in part on identifying that the first type of communication is to be performed, at least one of the first priority or the second priority during the time interval; and performing, by the UE, during the time interval and at different times, communications associated with the first and the second service, including the first type of communication, in accordance with the adjusted at least one of the first priority or the second priority.

Aspect 35: The method of Aspect 34, wherein the first service and the second service are non-voice services.

Aspect 36: The method of any of Aspects 34-35, wherein the first service and the second service are associated with scheduling-request-based scheduling configurations.

Aspect 37: The method of any of Aspects 34-36, wherein the first type of communication is a scheduling request, and the time interval includes a first time window associated with the first priority for the second service; and wherein the adjusting of the at least one of the first priority or the second priority comprises modifying the first time window associated with the first priority to include at least one scheduling request occasion associated with the second service.

Aspect 38: The method of Aspect 37, further comprising: determining a priority configuration indicating, for the second service, the first time window associated with the first priority and a second time window associated with the second priority, wherein the first time window and the second time window are within the time interval, and a first duration of the first time window has a fixed ratio to a second duration of the second time window; and wherein, for the priority configuration, the time interval is determined such that the first duration is equal to or larger than a scheduling request periodicity associated with the second service. wherein the first time window and the second time window are within the time interval, and a first duration of the first time window has a fixed ratio to a second duration of the second time window; and wherein, for the priority configuration, the time interval is determined such that the first duration is equal to or larger than a scheduling request periodicity associated with the second service.

Aspect 39: The method of Aspect 37, further comprising configuring the time interval including, for the second service, the first time window associated with the first priority and a second time window associated with the second priority, and wherein, if a scheduling request periodicity of the second service is greater than a first duration of the first time window, the time interval is configured to have a length based at least in part on dividing a predefined length of the time interval by the first duration of the first time window.

Aspect 40: The method of any of Aspects 34-39, wherein the first type of communication is an uplink control information (UCI) or reference signal (RS) transmission.

Aspect 41: The method of Aspect 40, wherein a periodicity of the UCI or RS transmission is determined as a maximum of a configured periodicity and a lower bound.

Aspect 42: The method of Aspect 40, wherein the UCI or RS transmission carries at least one of: a channel state information report, a sounding reference signal, or a hybrid automatic repeat request acknowledgment message.

Aspect 43: The method of Aspect 40, wherein adjusting the at least one of the first priority or the second priority during the time interval is based at least in part on a transmission cancellation counter specific to the first type of communication.

Aspect 44: The method of Aspect 40, wherein adjusting the at least one of the first priority or the second priority during the time interval is based at least in part on a plurality of transmission cancellation counters corresponding to respective types of communications.

Aspect 45: The method of Aspect 40, wherein the adjusting the at least one of the first priority or the second priority during the time interval further comprises: prioritizing the UCI or RS transmission based at least in part on a transmission cancellation counter of the UCI or RS transmission satisfying a threshold.

Aspect 46: The method of Aspect 45, wherein the prioritization of the UCI or RS transmission is performed by a physical layer of the UE.

Aspect 47: The method of Aspect 45, wherein the threshold for the transmission cancellation counter is determined based at least in part on a random or pseudo-random procedure.

Aspect 48: The method of Aspect 45, wherein the threshold for the transmission cancellation counter is predefined or configurable.

Aspect 49: The method of Aspect 45, wherein the transmission cancellation counter is one of a plurality of transmission cancellation counters, wherein one or more of the plurality of transmission cancellation counters are associated with the first service and one or more of the plurality of transmission cancellation counters are associated with the second service.

Aspect 50: The method of Aspect 45, wherein the transmission cancellation counter indicates a number of consecutive cancelled UCI or RS transmissions, of a particular type of communication and associated with a given service of the first service or the second service, and wherein the transmission cancellation counter is reset to an initial value when a transmission of the particular type of transmission is transmitted without cancellation for the given service.

Aspect 51: The method of any of Aspects 34-50, wherein performing the communications further comprises: obtaining, during a first time window associated with quality of service (QoS) based traffic at the first priority, one or more packets associated with a QoS level from a buffer, wherein the one or more packets are QoS based traffic; and transmitting the one or more packets.

Aspect 52: The method of Aspect 51, wherein the one or more packets are obtained irrespective of whether the one or more packets are associated with the first service or the second service.

Aspect 53: The method of Aspect 51, wherein the one or more packets are associated with at least one of: a voice call, a video telephony call, or a signaling radio bearer.

Aspect 54: The method of Aspect 51, wherein performing the communications further comprises: obtaining, during a second time window associated with the second priority, one or more non-QoS packets, wherein the one or more non-QoS packets are best-effort traffic; and transmitting the one or more non-QoS packets.

Aspect 55: The method of Aspect 54, wherein the one or more non-QoS packets are obtained irrespective of whether the one or more non-QoS packets are associated with the first service or the second service.

Aspect 56: The method of any of Aspects 34-55, wherein the first type of communication is a scheduling request.

Aspect 57: The method of Aspect 56, further comprising: determining a threshold for a transmit recovery procedure, wherein the threshold is defined based at least in part on an uplink grant cancellation ratio, and wherein adjusting the at least one of the first priority or the second priority during the time interval is based at least in part on the threshold for the transmit recovery procedure.

Aspect 58: The method of Aspect 57, wherein the uplink grant cancellation ratio is determined within a time window.

Aspect 59: The method of Aspect 57, wherein performing the communication further comprises: performing the transmit recovery procedure based at least in part on the uplink grant cancellation ratio satisfying a grant cancellation threshold.

Aspect 60: The method of Aspect 57, wherein the transmit recovery procedure comprises: initiating a physical random access channel (PRACH) procedure when the uplink grant cancellation ratio satisfies the grant cancellation threshold.

Aspect 61: The method of Aspect 60, wherein initiating the PRACH procedure includes: incrementing a preamble power ramping counter of the PRACH procedure.

Aspect 62: The method of Aspect 61, further comprising: maintaining a current value of an SR attempt counter based at least in part on one or more SRs being dropped due to a transmit resource limitation.

Aspect 63: The method of Aspect 61, wherein the transmit recovery procedure is associated with recovering from an out-of-synchronization state.

Aspect 64: The method of Aspect 57, where the transmit recovery procedure is based at least in part on a modulation and coding scheme (MC S) threshold for an uplink communication of the UE.

Aspect 65: The method of Aspect 57, wherein the threshold for the transmit recovery procedure is adjustable based at least in part on the uplink grant cancellation ratio.

Aspect 66: An apparatus for wireless communication at a device, comprising a processor; memory coupled with the processor; and instructions stored in the memory and executable by the processor to cause the apparatus to perform the method of one or more Aspects of Aspects 1-65.

Aspect 67: A device for wireless communication, comprising a memory and one or more processors coupled to the memory, the one or more processors configured to perform the method of one or more Aspects of Aspects 1-65.

Aspect 68: An apparatus for wireless communication, comprising at least one means for performing the method of one or more Aspects of Aspects 1-65.

Aspect 69: A non-transitory computer-readable medium storing code for wireless communication, the code comprising instructions executable by a processor to perform the method of one or more Aspects of Aspects 1-65.

Aspect 70: A non-transitory computer-readable medium storing a set of instructions for wireless communication, the set of instructions comprising one or more instructions that, when executed by one or more processors of a device, cause the device to perform the method of one or more Aspects of Aspects 1-65.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
      initiate a first service, having a first priority during a time interval, associated with a first subscriber identification module (SIM) of the UE;
      initiate a second service, having a second priority during the time interval, associated with a second SIM of the UE,
         wherein the first service and the second service are active at the same time, the first priority having a higher priority than the second priority;
      identify a first type of communication to be performed by the UE during the time interval, the first type of communication being associated with the second service and the time interval including a first time window associated with the first priority;
      adjust, based at least in part on the first type of communication being identified to be performed, at least one of the first priority or the second priority during the time interval,
         wherein the one or more processors, to adjust the at least one of the first priority or the second priority during the time interval, are configured to modify the first time window associated with the first priority to include at least one scheduling request occasion associated with the second service; and
      perform during the time interval and at different times, communications associated with the first service and the second service, including the first type of communication, in accordance with the adjusted at least one of the first priority or the second priority.

2. The UE of claim 1, wherein the first service and the second service are non-voice services.

3. The UE of claim 1, wherein the first service and the second service are associated with scheduling-request-based scheduling configurations.

4. The UE of claim 1, wherein the one or more processors are further configured to:
   determine a priority configuration indicating, for the second service, the first time window associated with the first priority and a second time window associated with the second priority,
      wherein the first time window and the second time window are within the time interval, and a first duration of the first time window has a fixed ratio to a second duration of the second time window; and
   wherein, for the priority configuration, the time interval is determined such that the first duration is equal to or larger than a scheduling request periodicity associated with the second service.

5. The UE of claim 1, wherein the one or more processors are further configured to:
   configure the time interval including, for the second service, the first time window associated with the first priority and a second time window associated with the second priority, and
   wherein, if a scheduling request periodicity of the second service is greater than a first duration of the first time window, the time interval is configured to have a length based at least in part on dividing a predefined length of the time interval by the first duration of the first time window.

6. The UE of claim 1, wherein the first type of communication is an uplink control information (UCI) or reference signal (RS) transmission.

7. The UE of claim 6, wherein a periodicity of the UCI or RS transmission is determined as a maximum of a configured periodicity and a lower bound.

8. The UE of claim 6, wherein, to adjust the at least one of the first priority or the second priority during the time interval, the one or more processors are configured to:
   prioritize the UCI or RS transmission based at least in part on a transmission cancellation counter of the UCI or RS transmission satisfying a threshold.

9. The UE of claim 8, wherein the transmission cancellation counter is one of a plurality of transmission cancellation counters, wherein one or more of the plurality of transmission cancellation counters are associated with the first service and one or more of the plurality of transmission cancellation counters are associated with the second service.

10. The UE of claim 8, wherein the transmission cancellation counter indicates a number of consecutive cancelled UCI or RS transmissions, of a particular type of communication and associated with a given service of the first service or the second service, and wherein the transmission cancellation counter is reset to an initial value when a transmission of the particular type of transmission is transmitted without cancellation for the given service.

11. The UE of claim 1, wherein, to adjust the at least one of the first priority or the second priority during the time interval, the one or more processors, are configured to:
   adjust the at least one of the first priority or the second priority during the time interval based at least in part on a transmission cancellation counter specific to the first type of communication.

12. The UE of claim 1, wherein the one or more processors, to perform the communications, are configured to:
   obtain, during a first time window associated with quality of service (QOS) based traffic at the first priority, one or more packets associated with a QoS level from a buffer, wherein the one or more packets are QoS based traffic; and
   transmit the one or more packets.

13. The UE of claim 12, wherein the one or more processors, to perform the communications, are configured to:
   obtain, during a second time window associated with the second priority, one or more non-QoS packets, wherein the one or more non-QoS packets are best-effort traffic; and
   transmit the one or more non-QoS packets.

14. The UE of claim 1, wherein the first type of communication is a scheduling request.

15. The UE of claim 14, wherein the one or more processors are further configured to:
   determine a threshold for a transmit recovery procedure, wherein the threshold is defined based at least in part on an uplink grant cancellation ratio, and wherein adjusting the at least one of the first priority or the second priority during the time interval is based at least in part on the threshold for the transmit recovery procedure.

16. The UE of claim 15, wherein the uplink grant cancellation ratio is determined within a time window.

17. The UE of claim 15, wherein the one or more processors, to perform the communication, are configured to:
perform the transmit recovery procedure based at least in part on the uplink grant cancellation ratio satisfying a grant cancellation threshold.

18. The UE of claim 17, wherein the transmit recovery procedure comprises a physical random access channel (PRACH) procedure when the uplink grant cancellation ratio satisfies the grant cancellation threshold.

19. The UE of claim 18, wherein the one or more processors are configured to:
increment a preamble power ramping counter of the PRACH procedure.

20. The UE of claim 15, where the transmit recovery procedure is based at least in part on a modulation and coding scheme (MCS) threshold for an uplink communication of the UE.

21. The UE of claim 15, wherein the threshold for the transmit recovery procedure is adjustable based at least in part on the uplink grant cancellation ratio.

22. A method of wireless communication performed by a user equipment (UE), comprising:
initiating a first service, having a first priority during a time interval, associated with a first subscriber identification module (SIM) of the UE;
initiating a second service, having a second priority during the time interval, associated with a second SIM of the UE,
wherein the first service and the second service are active at the same time, the first priority having a higher priority than the second priority;
identifying a first type of communication to be performed by the UE during the time interval, the first type of communication being associated with the second service and the time interval including a first time window associated with the first priority;
adjusting, based at least in part on identifying that the first type of communication is to be performed, at least one of the first priority or the second priority during the time interval,
wherein the adjusting of the at least one of the first priority or the second priority during the time interval comprises modifying the first time window associated with the first priority to include at least one scheduling request occasion associated with the second service; and
performing, by the UE, during the time interval and at different times, communications associated with the first and the second service, including the first type of communication, in accordance with the adjusted at least one of the first priority or the second priority.

23. The method of claim 22, wherein the first service and the second service are non-voice services.

24. The method of claim 22, wherein the first service and the second service are associated with scheduling-request-based scheduling configurations.

25. The method of claim 22, wherein the first type of communication is a scheduling request.

26. The method of claim 22, further comprising:
determining a threshold for a transmit recovery procedure, wherein the threshold is defined based at least in part on an uplink grant cancellation ratio, and wherein adjusting the at least one of the first priority or the second priority during the time interval is based at least in part on the threshold for the transmit recovery procedure.

27. A non-transitory computer-readable medium storing a set of instructions for wireless communication, the set of instructions comprising:
one or more instructions that, when executed by one or more processors of a user equipment (UE), cause the UE to:
initiate a first service, having a first priority during a time interval, associated with a first subscriber identification module (SIM) of the UE;
initiate a second service, having a second priority during the time interval, associated with a second SIM of the UE,
wherein the first service and the second service are active at the same time, the first priority having a higher priority than the second priority;
identify a first type of communication to be performed by the UE during the time interval, the first type of communication being associated with the second service and the time interval including a first time window associated with the first priority;
adjust, based at least in part on the first type of communication being identified to be performed, at least one of the first priority or the second priority during the time interval,
wherein the one or more instructions, that cause the UE to adjust the at least one of the first priority or the second priority during the time interval, cause the UE to modify the first time window associated with the first priority to include at least one scheduling request occasion associated with the second service; and
perform during the time interval and at different times, communications associated with the first and the second service, including the first type of communication, in accordance with the adjusted at least one of the first priority or the second priority.

28. The non-transitory computer-readable medium of claim 27, wherein the first service and the second service are non-voice services.

29. An apparatus for wireless communication, comprising:
means for initiating a first service, having a first priority during a time interval, associated with a first subscriber identification module (SIM) of the apparatus;
means for initiating a second service, having a second priority during the time interval, associated with a second SIM of the apparatus,
wherein the first service and the second service are active at the same time, the first priority having a higher priority than the second priority;
means for identifying a first type of communication to be performed by the apparatus during the time interval, the first type of communication being associated with the second service and the time interval including a first time window associated with the first priority;
means for adjusting, based at least in part on identifying that the first type of communication is to be performed, at least one of the first priority or the second priority during the time interval,
wherein the means for adjusting of the at least one of the first priority or the second priority during the time interval comprises means for modifying the first time window associated with the first priority to include at least one scheduling request occasion associated with the second service; and
means for performing during the time interval and at different times, communications associated with the first and the second service, including the first type of communication, in accordance with the adjusted at least one of the first priority or the second priority.

30. The apparatus of claim 29, wherein the first service and the second service are non-voice services.

* * * * *